(12) United States Patent
Luthra et al.

(10) Patent No.: US 11,665,063 B1
(45) Date of Patent: May 30, 2023

(54) METHOD, APPARATUS, AND COMPUTER READABLE MEDIUM

(71) Applicant: Rakuten Mobile, Inc., Tokyo (JP)

(72) Inventors: Mohit Luthra, Singapore (SG); Krishna Patel, Madhya Pradesh (IN); Abhay Mahajan, Tokyo (JP); Pawan Shriwas, Madhya Pradesh (IN); Pankaj Pachori, Madhya Pradesh (IN); Apurva Tripathi, Madhya Pradesh (IN); Seihin Shu, Tokyo (JP); Ayush Kumar Singh, Madhya Pradesh (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/645,944

(22) Filed: Dec. 23, 2021

(51) Int. Cl.
*G06F 15/177* (2006.01)
*H04L 41/12* (2022.01)
*H04L 67/10* (2022.01)

(52) U.S. Cl.
CPC .............. *H04L 41/12* (2013.01); *H04L 67/10* (2013.01)

(58) Field of Classification Search
CPC .............................. H04L 41/12; H04L 67/10
See application file for complete search history.

(56) References Cited

U.S. PATENT DOCUMENTS

2007/0239868 A1* 10/2007 Shah .................... G06Q 10/087
709/224

* cited by examiner

*Primary Examiner* — Hua Fan
(74) *Attorney, Agent, or Firm* — Hauptman Ham, LLP

(57) ABSTRACT

A method includes identifying, by a first server, a set of servers in an edge data center, discovering details of a plurality of components of each corresponding server of the set of servers, updating inventory of the set of servers based on at least the details of the plurality of components of each corresponding server of the set of servers, and performing health checks on the set of servers according to a health check frequency. The first server is connected to the set of servers by a switch. Performing the health checks includes detecting a removal of a second server from the set of servers, detecting an addition of the second server to the set of servers, detecting an addition of a new component in the second server, or detecting a replacement of a failed component in the second server in response to detecting a failure of the failed component.

17 Claims, 14 Drawing Sheets

|  | Column 1 | Column 2 | Column 3 | Column 4 |
|---|---|---|---|---|
| Row 1 | Data center number | Data center name | Data center status | Data Center Location |
| Row 2 | 1 | J1 | DRAFT | USA |
| Row 3 | 2 | J2 | DRAFT | Tokyo |
| Row 4 | 3 | J3 | CONFIGURED | London |
| Row 5 | 4 | J4 | CONFIGURED | Tokyo |
| Row 6 | 5 | J5 | CONFIGURED | Tokyo |

| | Column 1 | Column 2 | Column 3 |
|---|---|---|---|
| Row 1 | Server number | Server name(s) | Server status |
| Row 2 | 1 | JOE1 | ENABLED |
| Row 3 | 2 | JOE2 | ENABLED |
| Row 4 | 3 | BOB1 | ENABLED |
| Row 5 | 4 | BOB2 | ENABLED |
| Row 6 | | | |

METHOD, APPARATUS, AND COMPUTER READABLE MEDIUM

BACKGROUND

Network service providers and device manufacturers (e.g., wireless, cellular, etc.) are continually challenged to deliver value and convenience to consumers by, for example, providing compelling network services that are capable of being flexibly constructed, scalable and diverse.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 12A is a diagram of a network inventory information, in accordance with some embodiments.

FIG. 12B is a diagram of physical inventory, in accordance with some embodiments.

DETAILED DESCRIPTION

Figure 1:
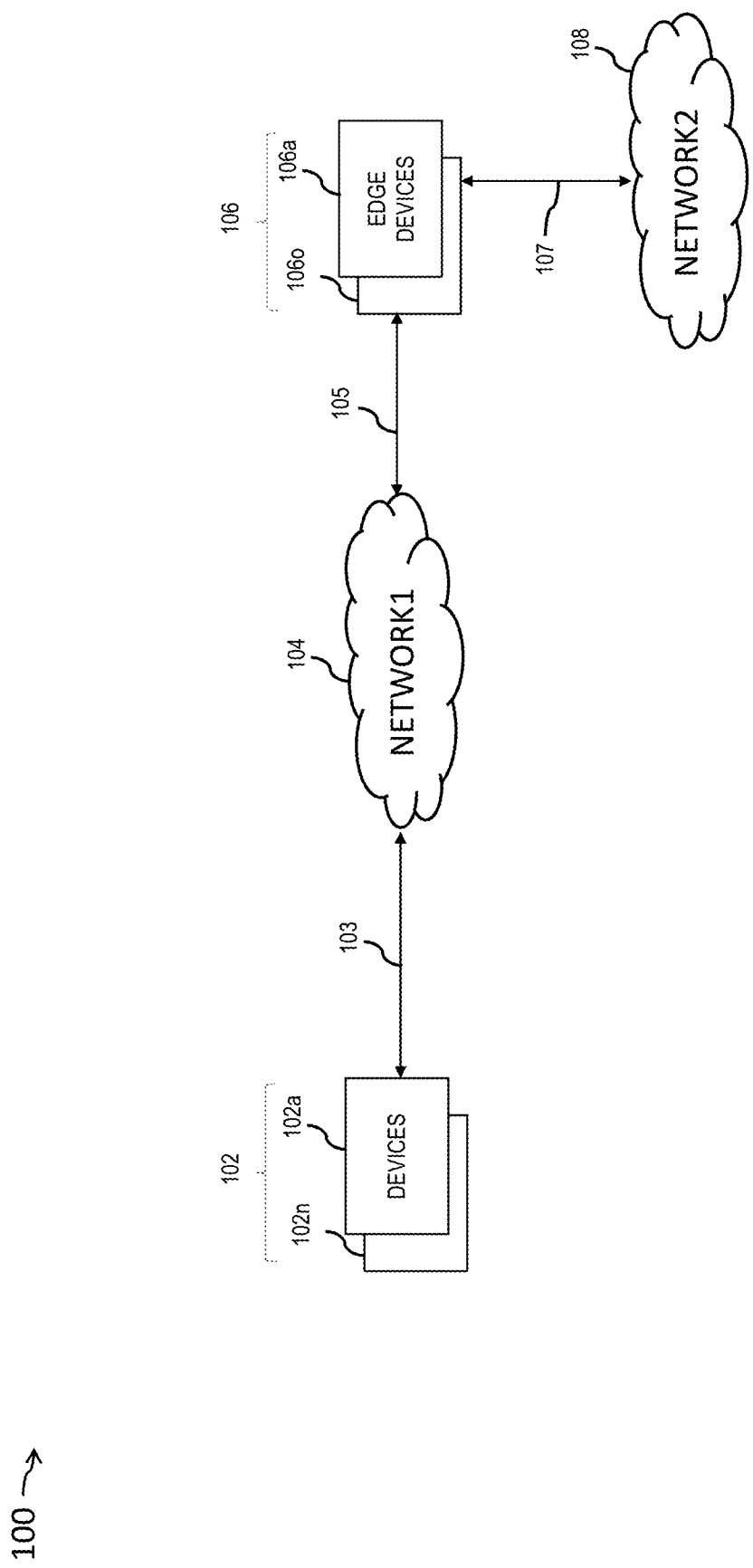
FIG. 1 is a block diagram of a communication system, in accordance with some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Network services are often provided by static or inflexible systems that are difficult to configure, scale, and deploy over various target areas. Network service providers are challenged to provide network systems and/or network services that are capable of being flexibly constructed, scalable and diverse.

Some network systems deploy changes to the network in various steps, and few steps are automated, and the other steps are manual. For example, when components in servers are added/removed or servers are added/removed, for each step, a discovery process of the changes are not automated, which makes tracking any network changes very time consuming.

FIG. 1 is a block diagram of a communication system 100 (hereinafter referred to as "system 100"), in accordance with some embodiments.

System 100 includes a set of devices 102 coupled to a network 104 by a link 103, and the network 104 is further coupled to a set of edge devices 106 by a link 105. System 100 further includes a network 108 coupled to the set of edge devices 106 by a link 107. The set of edge devices 106 and the set of devices 102 are coupled to each other by network 104.

The set of devices 102 includes at least device 102a, 102b, . . . , 102m or 102n, where n is an integer corresponding to a number of devices in the set of devices 102. In some embodiments, one or more devices in the set of devices 102 corresponds to a computing device, a computing system or a server. In some embodiments, a device 201 (FIG. 2) corresponds to one or more devices 102a, 102b, . . . , 102n of the set of devices 102. In some embodiments, a device 901 (FIG. 9) corresponds to one or more devices 102a, 102b, . . . , 102n of the set of devices 102. In some embodiments, a device 1001 (FIG. 10) corresponds to one or more devices 102a, 102b, . . . , 102n of the set of devices 102. In some embodiments, a device 1101 (FIG. 11) corresponds to one or more devices 102a, 102b, . . . , 102n of the set of devices 102. In some embodiments, system 1300 (FIG. 13) is an embodiment of one or more devices 102a, 102b, . . . , 102n of the set of devices 102. In some embodiments, the set of devices 102 corresponds to a server farm. In some embodiments, the set of devices 102 corresponds to a data center.

In some embodiments, one or more of the devices of the set of devices 102 is a type of mobile terminal, fixed terminal, or portable terminal including a desktop computer, laptop computer, notebook computer, netbook computer, tablet computer, wearable circuitry, mobile handset, server, gaming console, or combination thereof. In some embodiments, one or more of the devices of the set of devices 102 comprises a display by which a user interface is displayed.

Other configurations, different types of devices or other number of sets in the set of devices 102 are within the scope of the present disclosure.

The set of edge devices 106 includes at least edge device 106a, 106b, . . . , 106n or 106o, where o is an integer corresponding to a number of edge devices in the set of edge devices 106. In some embodiments, integer o is greater than integer n. In some embodiments, integer o is greater than integer n by at least a factor of 100. In some embodiments, the integer o is greater than integer n by at least a factor of 1000. Other factors are within the scope of the present disclosure.

Figure 2:
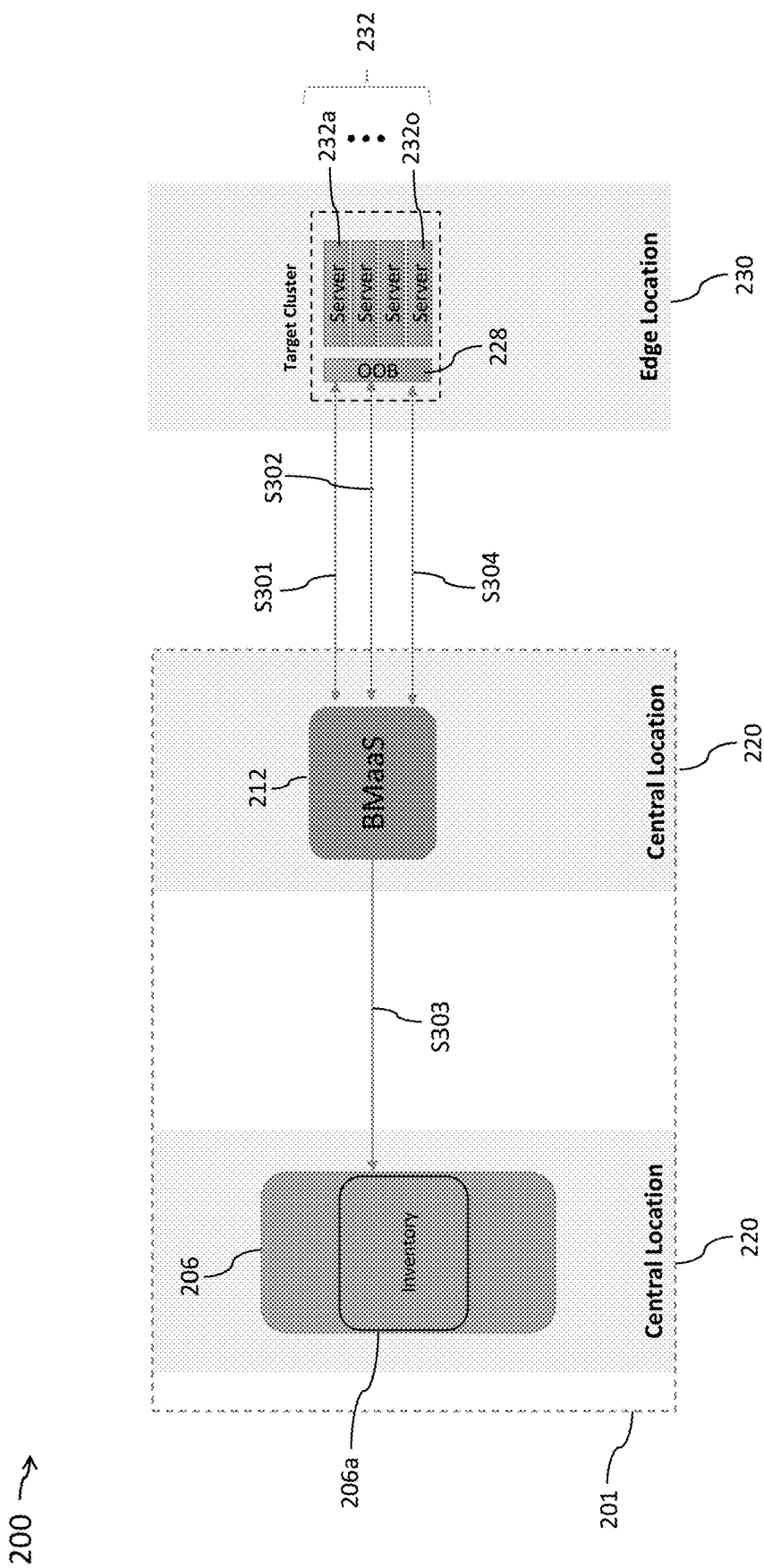
FIG. 2 is a block diagram of a system, in accordance with some embodiments.

In some embodiments, one or more edge devices in the set of edge devices 106 corresponds to a computing device, computing system or a server. In some embodiments, the set of edge devices 106 corresponds to at least a set of target servers 232 (FIG. 2) or one or more switches, such as a switch 228 (FIG. 2). In some embodiments, system 1300 (FIG. 13) is an embodiment of one or more edge devices 106a, 106b, . . . , 106n or 106o of the set of edge devices 106. In some embodiments, the set of edge devices 106 corresponds to a server farm. In some embodiments, the set of edge devices 106 corresponds to a data center.

Other configurations, different types of edge devices or other number of sets in the set of edge devices 106 are within the scope of the present disclosure.

In some embodiments, at least network 104 or 108 corresponds to a wired or wireless network. In some embodiments, at least network 104 or 108 corresponds to a local area network (LAN). In some embodiments, at least network 104 or 108 corresponds to a wide area network (WAN). In some embodiments, at least network 104 or 108 corresponds to a metropolitan area network (MAN). In some embodiments, at least network 104 or 108 corresponds to an internet area network (IAN), a campus area network (CAN) or a virtual private networks (VPN). In some embodiments, at least network 104 or 108 corresponds to the Internet.

Other configurations, number of networks or different types of network in at least network 104 or 108 are within the scope of the present disclosure.

In some embodiments, at least link 103, 105 or 107 is a wired link. In some embodiments, at least link 103, 105 or 107 is a wireless link. In some embodiments, at least link 103, 105 or 107 corresponds to any transmission medium type; e.g. fiber optic cabling, any wired cabling, and any wireless link type(s). In some embodiments, at least link 103, 105 or 107 corresponds to shielded, twisted-pair cabling, copper cabling, fiber optic cabling, and/or encrypted data links.

In some embodiments, at least link 103, 105 or 107 is based on different technologies, such as code division multiple access (CDMA), wideband CDMA (WCDMA), time division multiple access (TDMA), frequency division multiple access (FDMA), Orthogonal Frequency Division Multiplexing (OFDM), time division duplexing (TDD), frequency division duplexing (FDD), Bluetooth, Infrared (IR), or the like, or other protocols that may be used in a wireless communications network or a wired data communications network. Accordingly, the exemplary illustrations provided herein are not intended to limit the embodiments of the disclosure and are merely to aid in the description of aspects of the embodiments of the disclosure.

Other configurations or number of links in at least in link 103, 105 or 107 are within the scope of the present disclosure. For example, while FIG. 1 shows a single link for each of link 103, 105 or 107, one or more of links 103, 105 or 107 include a plurality of links.

Other configurations or number of elements in system 100 are within the scope of the present disclosure.

FIG. 2 is a block diagram of a system 200, in accordance with some embodiments.

System 200 is an embodiment of system 100, and similar detailed description is omitted.

System 200 includes a device 201 connected to a switch 228 and a set of target servers 232 (hereinafter referred to as "set of servers 232").

Device 201 is connected to the set of servers 232 by the switch 228. Device 201 is located at a location 220. In some embodiments, location 220 is referred to as a central location.

At least the switch 228 or the set of servers 232 is located at an edge location 230. The location 220 is different from an edge location 230. In some embodiments, the location 220 is at a same location as the edge location 230.

Figure 3:
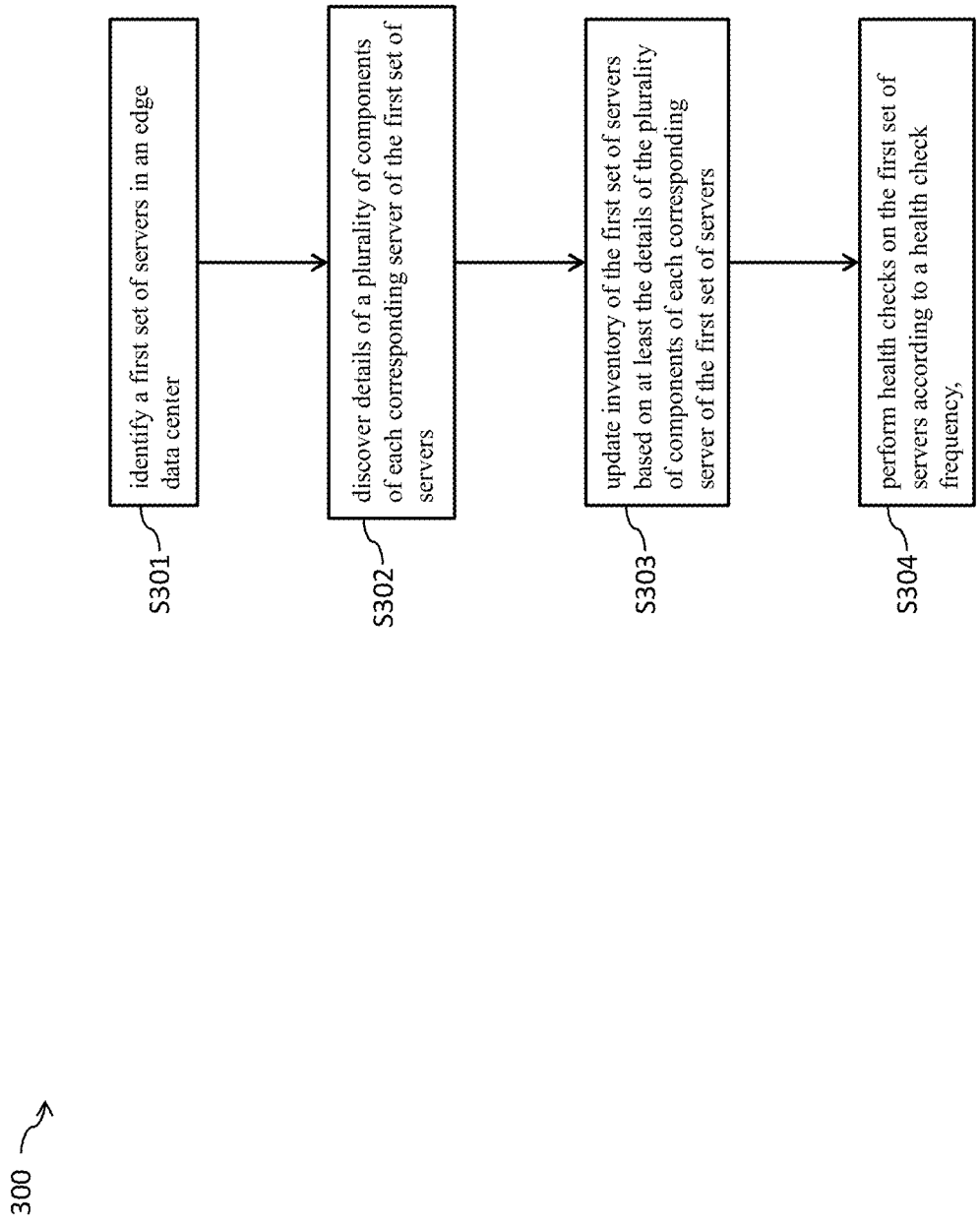
FIG. 3 is a flowchart of a method, in accordance with some embodiments.

System 200 shows a series of steps or operations (e.g., S301, S302, S303 and S304), performed by system 200, and are described in FIG. 3 as method 300.

Device 201 is an embodiment of one or more devices in the set of devices 102 of FIG. 1, and similar detailed description is omitted. At least the switch 228 or the set of servers 232 is an embodiment of one or more edge devices in the set of edge devices 106 of FIG. 1, and similar detailed description is omitted. Device 201 is coupled to at least the switch 228 by a network 104. Device 201 is coupled to the set of servers 232 by a network (not shown) similar to network 104.

Switch 228 is configured to connect the set of servers 232 to device 201 by network 104 of FIG. 1. In some embodiments, switch 228 is configured to connect the set of servers 232 to/from the network 104 of FIG. 1. In some embodiments, switch 228 is configured to connect the set of edge devices 106 to/from the network 104. In some embodiments, switch 228 is an out of band (OOB) switch. In some embodiments, switch 228 is a Gigabit Ethernet switch. In some embodiments, switch 228 is a 10 Gigabit (10G) Ethernet switch. Other switch types are within the scope of the present disclosure.

Switch 228 includes one or more ports (not shown). In some embodiments, a number of ports in switch 228 is greater than a number of servers t in the set of servers 232. In some embodiments, the number of ports in switch 228 is less than the number of servers t in the set of servers 232. In some embodiments, the number of ports in switch 228 is equal to the number of servers t in the set of target servers 232.

Switch 228 is a layer 2 switch. In some embodiments, switch 228 is referred to as a multiport bridge. In some embodiments, switch 228 is configured to use media access control (MAC) addresses to forward data at a data link layer (e.g., layer 2) of the Open Systems Interconnection (OSI) model.

In some embodiments, switch 228 is a layer 3 switch. In some embodiments, switch 228 is referred to as a multi-layer switch. In some embodiments, switch 228 is configured to use internet protocol (IP) addresses to forward data at a network layer (e.g., layer 3) of the OSI model, and switch 228 is configured to use routing functionality.

While FIGS. 2, 4-5 and 7-10 show one switch 228, other numbers of switches for switch 228 are within the scope of the present disclosure.

The set of servers 232 includes at least target server 232a, 232b, . . . , 232s or 232t, where t is an integer corresponding to a number of servers in the set of servers 232.

The target servers in the set of servers 232 are a logical grouping of target servers. For example, in some embodiments, the set of servers 232 are servers located within one server device. For example, in some embodiments, the set of servers 232 are servers located within more than one server device. While FIGS. 2, 4-5 and 7-10 show one set of servers, other numbers of sets of server 232 and other numbers of servers within the set of servers 232 are within the scope of the present disclosure. Furthermore, while FIGS. 2, 4-5 and 7-10 show one edge location 230, other numbers of edge locations are within the scope of the present disclosure, and a number of servers in the other edge locations can be the same or different from the number of servers t in the edge location 230.

Device 201 is configured to automatically discover one or more datacenter assets. The one or more datacenter assets are automatically updated in a database storage device 206 as inventory 206a. In some embodiments, the one or more datacenter assets includes the set of servers 232 and a plurality of components of each corresponding server of the set of servers 232. In some embodiments, the one or more datacenter assets includes other items.

In some embodiments, inventory 206a is a centralized place for all complete network inventory. In some embodiments, network inventory includes physical inventory and logical inventory. In some embodiments, physical inventory includes servers, racks, switches, hardware, or the like. In some embodiments, logical inventory includes software, IP addresses, hostnames, application details, or the like.

In some embodiments, the plurality of components of each corresponding server of the set of servers 232 includes at least memory, hard drive disk, peripheral component interconnect express (PCIe) devices, redundant array of independent disks (RAID), central processing unit (CPU), power supply units, basic input output system (BIOS), network interface cards (NIC), fans, or field programmable gate array (FPGA).

In some embodiments, device 201 is configured to log-in to one or more switches located at an edge datacenter, find the set of servers 232 by scanning and identifying the media access control (MAC) address of each server in the set of servers 232, scanning a plurality of components inside each server of the set of servers 232, and sending the results of the scan to inventory 206a. In some embodiments, device 201 is configured to send the updates of the scan to inventory 206a.

Device 201 includes a database storage device 206 (hereinafter referred to as a "database 206") and a server 212. Database storage device 206 is coupled to a server 212. Database storage device 206 is configured to store one or more databases. In some embodiments, the one or more databases stored in database storage device 206 includes an inventory 206a. Stated differently, inventory 206a is a database stored in database storage device 206.

Inventory 206a is an organized collection of data or structured information that is stored in database storage device 206. In some embodiments, inventory 206a is a non-relational database. In some embodiments, inventory 206a is a relational database that is configured to use Structured Query Language (SQL).

In some embodiments, inventory 206a includes the one or more datacenter assets. In some embodiments, inventory 206a includes at least the set of servers 232 or the details of the plurality of components of each corresponding server of the set of servers 232. In some embodiments, the details of the plurality of components of each corresponding server of the set of servers 232 includes the set of servers 232, and at least memory, hard drive disk, peripheral component interconnect express (PCIe) devices, redundant array of independent disks (RAID), central processing unit (CPU), power supply units, basic input output system (BIOS), network interface cards (NIC), fans, or field programmable gate array (FPGA) for each corresponding component of the plurality of components in the set of servers 232.

In some embodiments, system 1300 (FIG. 13) corresponds to an embodiment of database storage device 206. Other configurations and other types of data stored in inventory 206a are within the scope of the present disclosure.

Server 212 is a Bare Metal Server, and is hereinafter referred to as "BMaaS 212." BMaaS 212 is connected to database storage device 206, and BMaaS 212 is further connected to the set of servers 232 by switch 228.

BMaaS 212 is configured to identify the set of servers 232 in an edge data center (e.g., edge location 230). BMaaS 212 is configured to discover the details of a plurality of components of each corresponding server of the set of servers 232. BMaaS 212 is configured to update inventory 206a of the set of servers 232 based on at least the details of the plurality of components of each corresponding server of the set of servers 232. BMaaS 212 is configured to perform health checks on the set of servers 232 according to a health check frequency.

In some embodiments, the health check frequency is a duration of how often the BMaaS 212 performs health checks on the set of servers 232. In some embodiments, the health check frequency can be daily, weekly, real-time configuration files, or any other types of health check frequencies that are set by a user, such as user 1002 in FIG. 10. In some embodiments, the health check frequency includes any metric of time set by user 1002.

In some embodiments, the health check frequency is daily, and thus the BMaaS 212 is configured to perform health checks on the set of servers 232 daily. In some embodiments, the health check frequency is weekly, and thus the BMaaS 212 is configured to perform health checks on the set of servers 232 weekly. In some embodiments, the health check frequency is real-time, and thus the BMaaS 212 is configured to perform health checks on the set of servers 232 in real-time.

In some embodiments, performing the health checks on the set of servers 232 includes at least one of detecting a removal of a server from the set of servers 232, detecting an addition of a server to the set of servers 232, detecting the addition of a new component in a server of the set of servers 232, or detecting the replacement of a failed component in a server of the set of servers 232 in response to detecting a failure of the failed component.

In some embodiments, system 1300 (FIG. 13) corresponds to an embodiment of BMaaS 212.

In some embodiments, by using BMaaS 212 to automatically discover the details of a plurality of components of each corresponding server of the set of servers 232, and to update inventory 206a based on at least the details of the plurality of components of each corresponding server of the set of servers 232 reduces the time to obtain server information at the data centers and improves the accuracy of the server information compared to other approaches where a user scans server information manually with a barcode scanner, but is not able to obtain component information of the servers.

In some embodiments, by using BMaaS 212 to identify the set of servers 232, the identification is performed from a central location compared to other approaches where a user has to visit each edge location and manually scan each server.

In some embodiments, by using BMaaS 212 to identify the set of servers 232, the details of the set of servers 232 are stored in BMaaS 212 is automated and accuracy improves compared to other approaches where a user manages the list of servers in a spreadsheet and is prone to human error.

In some embodiments, by using BMaaS 212 to discover server component information of the set of servers 232, BMaaS is configured to perform periodic or real-time reconciliation of the details of server components in the set of servers 232 compared to other approaches where no information of internal server components is obtained.

In some embodiments, by using BMaaS 212 to automatically update the inventory 206a of the set of servers 232 and the details of the plurality of components of each corresponding server of the set of servers 232, system 200 automatically updates the database storage device 206 of server information compared to other approaches that manually provide server inventory information to an inventory database.

In some embodiments, by using BMaaS 212 to perform health checks on the set of servers 232, BMaaS is configured to perform at least a periodic reconciliation or a real-time reconciliation of server component details and automatically provides updates to inventory 206a compared to other approaches where a user must update inventory once any manual changes to the server configuration have been performed.

Figure 9:
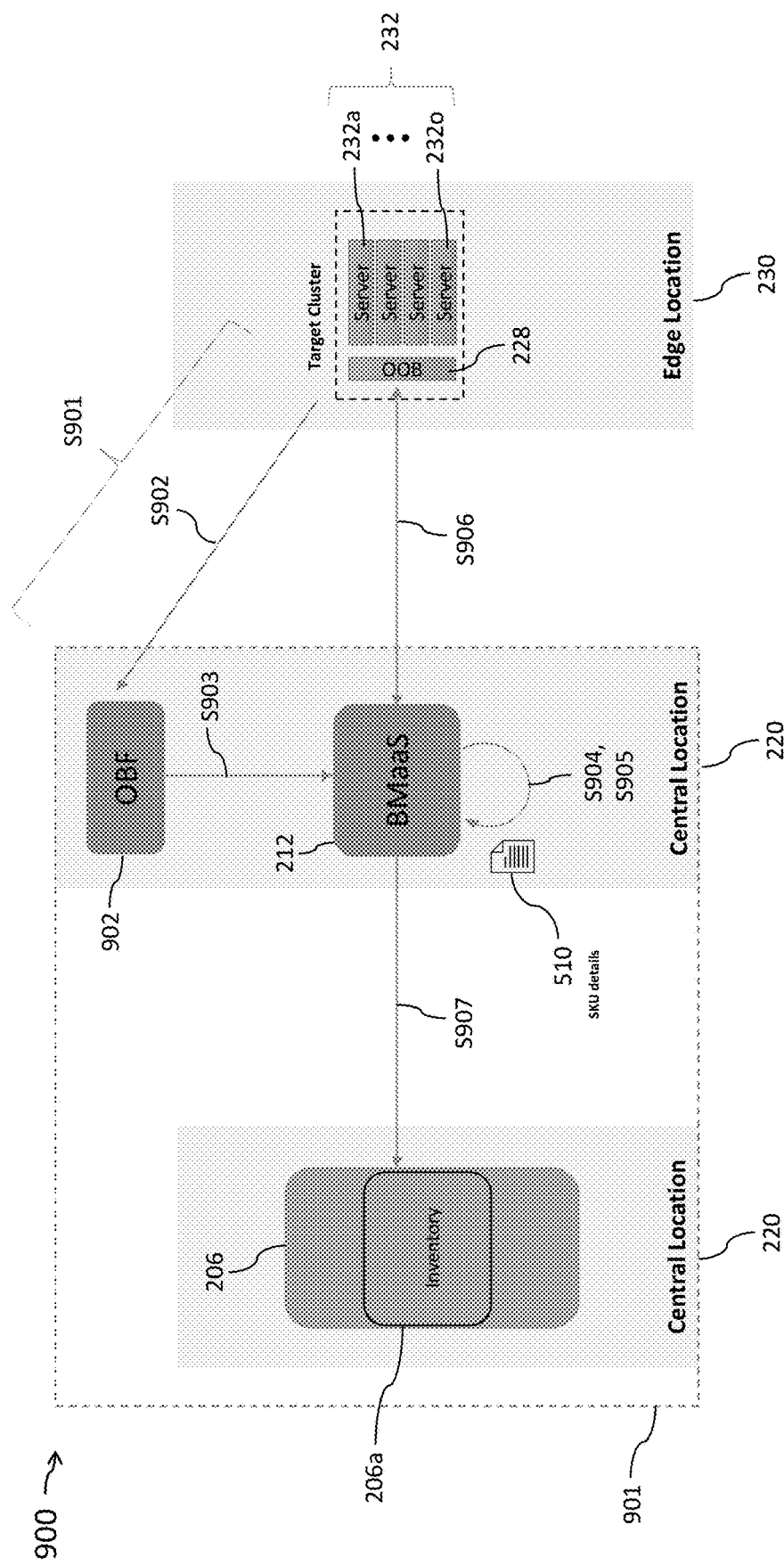
FIG. 9 is a flowchart of a method of operating a system, in accordance with some embodiments.
Figure 10:
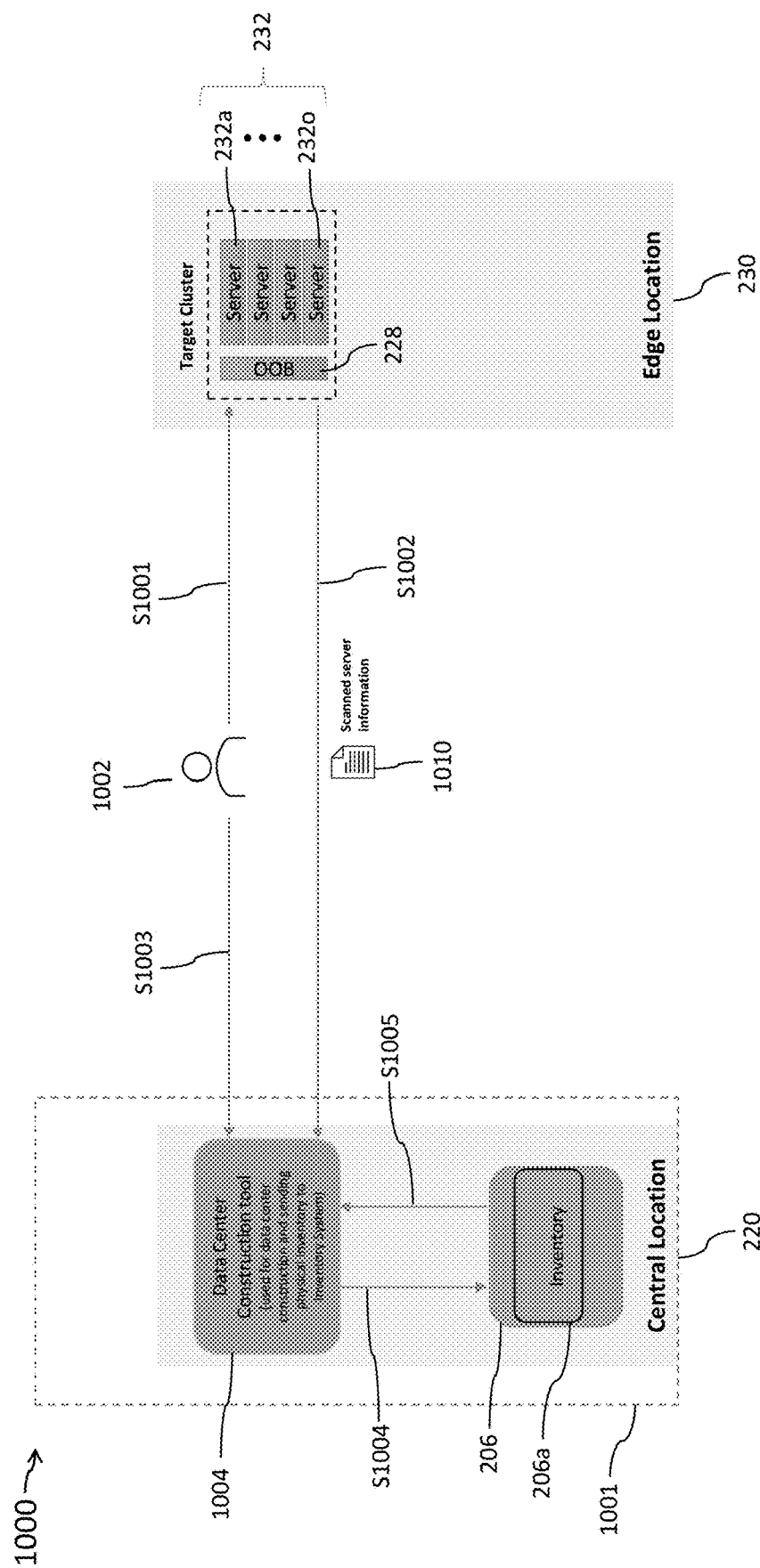
FIG. 10 is a flowchart of a method of operating a system, in accordance with some embodiments.
Figure 11:
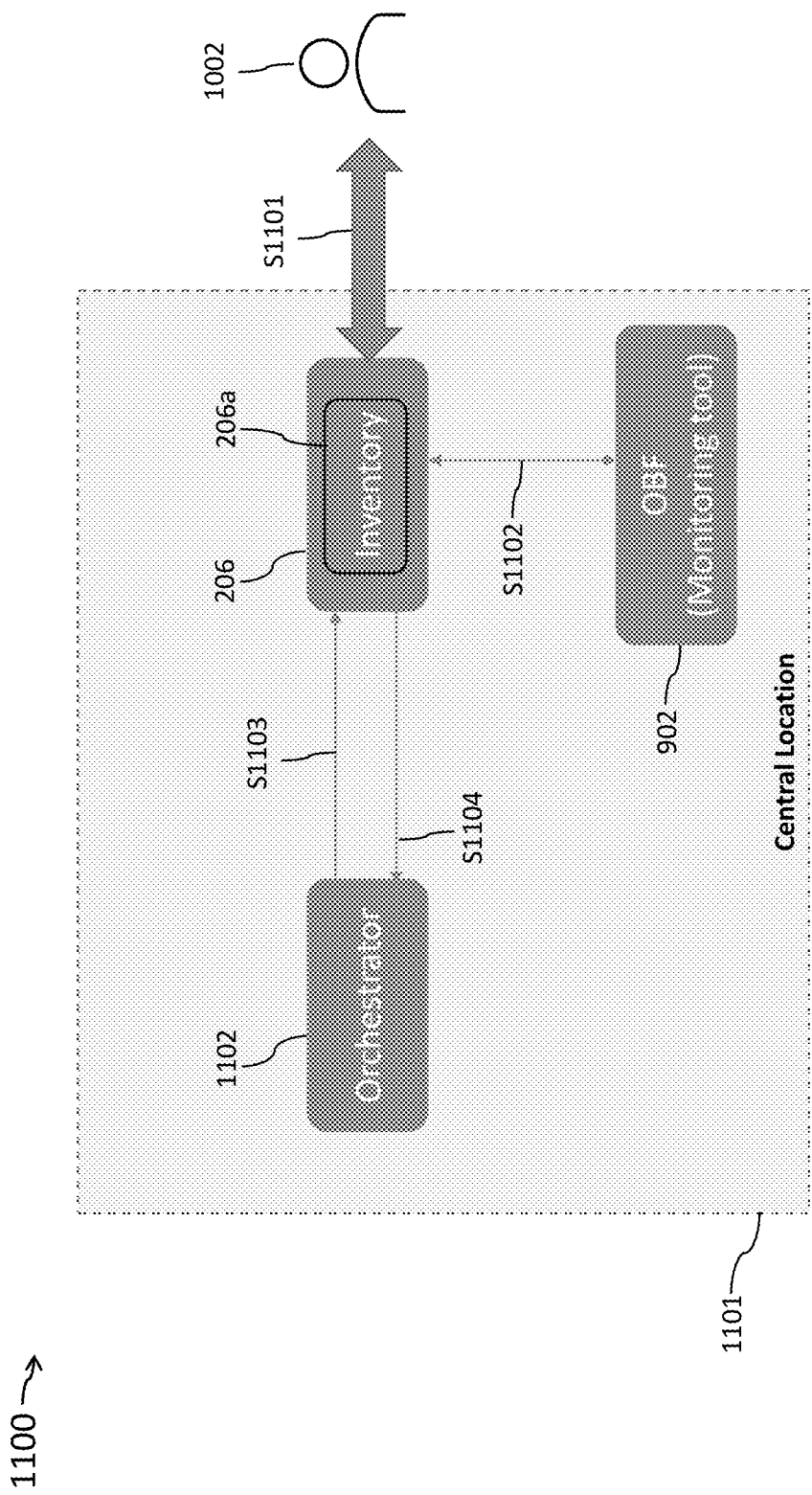
FIG. 11 is a flowchart of a method of operating a system, in accordance with some embodiments.

In some embodiments, device 201 includes one or more other components as shown in FIGS. 9, 10 and 11. In these embodiments, at least device 201, 901, 1001 or 1101 is configured to automatically provision and to automatically deploy one or more software applications on at least the set of servers 232. In some embodiments, at least device 201, 901, 1001 or 1101 is configured to provide automatic end-to-end orchestration, deployment, configuration and management of the one or more software applications on at least the set of servers 232. In these embodiments, the set of servers 232 are configured to store, execute and provide access to the one or more deployed applications by network 104 and 108 to other devices (including the set of devices 102).

Other configurations or number of elements in system 200 are within the scope of the present disclosure.

FIG. 3 is a flowchart of a method 300, in accordance with some embodiments.

In some embodiments, FIG. 3 is a flowchart of a method of operating system 100 of FIG. 1 or system 200 of FIG. 2, and similar detailed description is therefore omitted. It is understood that additional operations may be performed before, during, and/or after the method 300 depicted in FIG. 3, and that some other operations may only be briefly described herein. In some embodiments, other order of operations of method 300 is within the scope of the present disclosure. In some embodiments, one or more operations of method 300 are not performed.

Method 300 includes exemplary operations, but the operations are not necessarily performed in the order shown. Operations may be added, replaced, changed order, and/or eliminated as appropriate, in accordance with the spirit and scope of disclosed embodiments. It is understood that method 300 utilizes features of one or more of system 100, system 200 or the configuration of the internal component details of the discovered servers 800.

In operation S301 of method 300, the set of servers 232 in one or more edge data centers (e.g., edge location 230) are identified by BMaaS 212. In some embodiments, operation S301 includes BMaaS 212 finding the entry details of switch 228, and discovering the servers (set of servers 232) connected to switch 228.

In operation S302 of method 300, details of a plurality of components of each corresponding server of the set of servers 232 are discovered by BMaaS 212. In some embodiments, after discovering baseband management controller (BMC) internet protocol (IP) details from operation S301, BMaaS 212 is configured to discover the internal components of each server of the set of servers 232.

Figure 6:
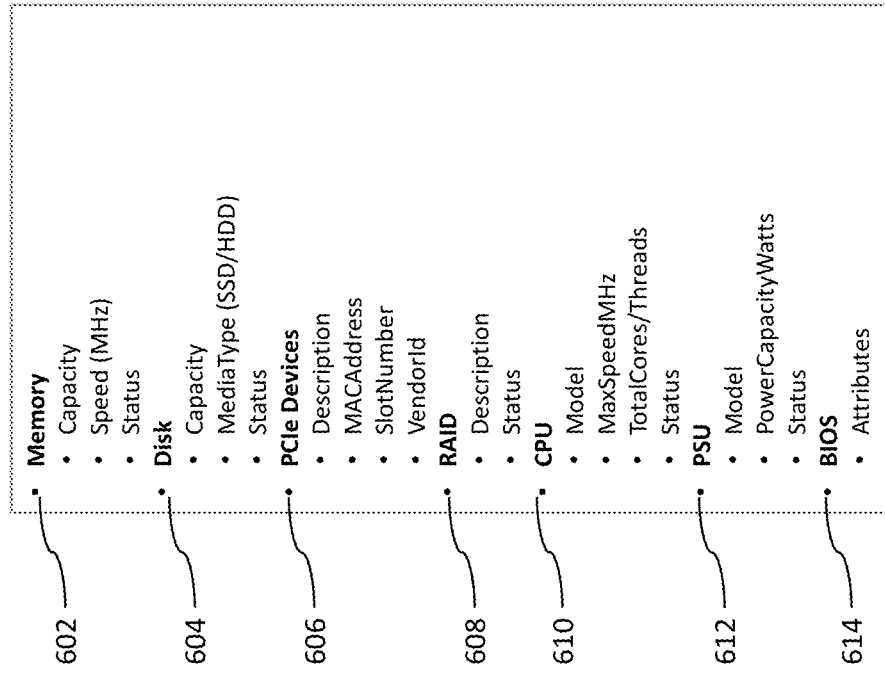
FIG. 6 is a diagram of SKU details, in accordance with some embodiments.

In some embodiments, the details of the plurality of components of each corresponding server of the set of servers 232 that are discovered by BMaaS 212 are described as shown in FIG. 6. In some embodiments, the details of the plurality of components of each corresponding server of the set of servers 232 includes the set of servers 232, and at least memory, hard drive disk, peripheral component interconnect express (PCIe) devices, redundant array of independent disks (RAID), central processing unit (CPU), power supply units, basic input output system (BIOS), network interface cards (NIC), fans, or field programmable gate array (FPGA) for each corresponding component of the plurality of components in the set of servers 232.

In operation S303 of method 300, inventory 206a is updated by BMaaS 212 of the set of servers 212 based on at least the details of the plurality of components of each corresponding server of the set of servers 232. In some embodiments, in operation S303, BMaaS 212 is configured to store information on the set of servers 232 and details of the internal components of the set of servers 232 to inventory 206a using one or more application programming interfaces (APIs).

In operation S304 of method 300, health checks are performed on the set of servers 232 according to a health check frequency by BMaaS 212.

In some embodiments, the health check frequency is daily, and thus the BMaaS 212 is configured to perform health checks on the set of servers 232 daily. In some embodiments, the health check frequency is weekly, and thus the BMaaS 212 is configured to perform health checks on the set of servers 232 weekly. In some embodiments, the health check frequency is real-time, and thus the BMaaS 212 is configured to perform health checks on the set of servers 232 in real-time. In some embodiments, the health check frequency is real-time or set by user 1002.

In some embodiments, operation S304 further includes BMaaS 212 performing periodic reconciliation of server details and server component details by an automated workflow according to the health check frequency thereby keeping inventory 206a up to date. In some embodiments, operation S304 further includes BMaaS 212 performing periodic reconciliation of server details and server component details by an automated workflow on a daily basis (e.g., health check frequency is daily) thereby keeping inventory 206a up to date.

In some embodiments, operation S304 further includes BMaaS 212 performing an alert-based or real-time reconciliation of server details and server component details by an automated workflow according to the health check frequency (e.g., a real-time) thereby keeping inventory 206a up to date.

In some embodiments, operation S304 further includes at least one of detecting a removal of one or more servers from the set of servers 232, detecting an addition of one or more servers to the set of servers 232, detecting the addition of one or more new components in the set of servers 232, or detecting the replacement of one or more failed components in the set of servers in response to detecting one or more corresponding failures of corresponding failed components. In some embodiments, operation S304 includes one or more users manually adding or removing one or more server components (e.g., one or more users added additional memory card in the one or more servers) from a server of the set of servers 232 which is captured during periodic reconciliation of server details and server component details of the set of servers 232. In some embodiments, operation S304 includes one or more server components or servers of the set of servers 232 is damaged or has missing components which is captured during periodic reconciliation of server details and server component details of the set of servers 232.

Figure 4:
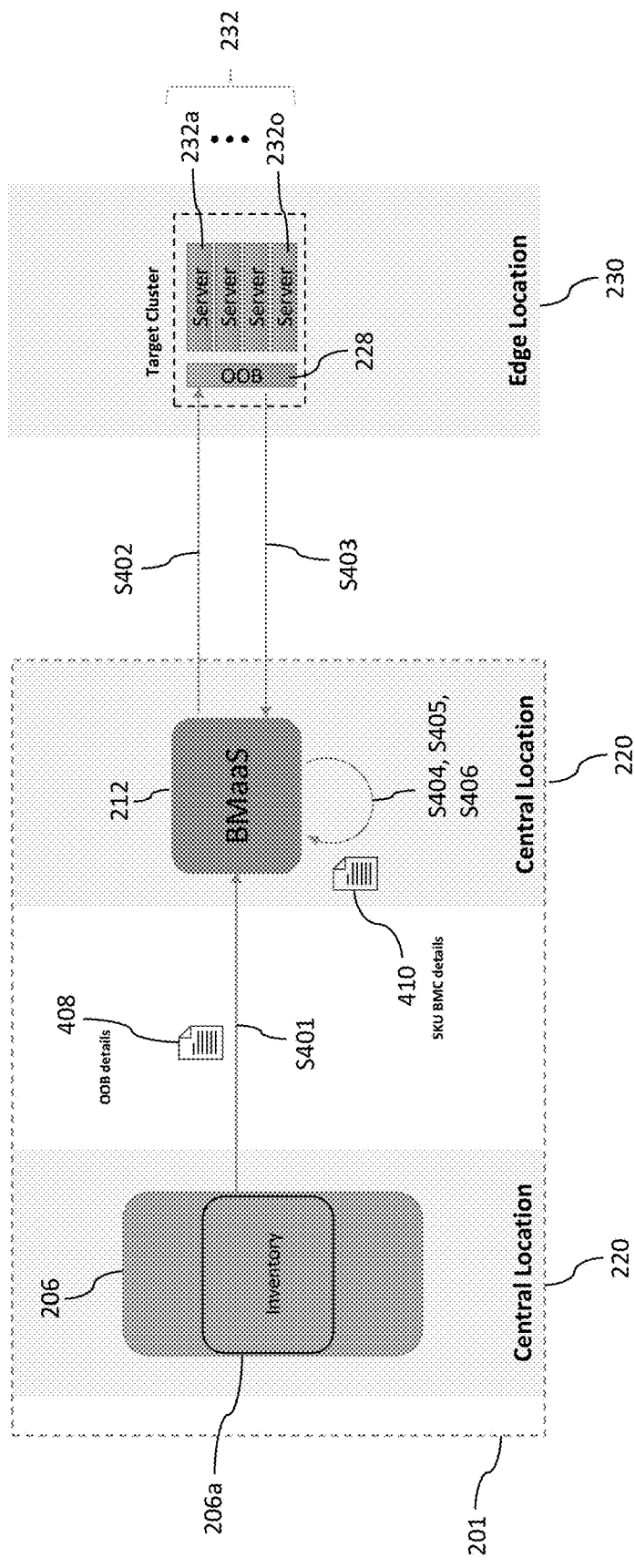
FIG. 4 is a flowchart of a method, in accordance with some embodiments.

FIG. 4 is a flowchart of a method 400, in accordance with some embodiments.

Method 400 is an embodiment of at least operation S301 of method 300 of FIGS. 2 and 3, and similar detailed description is therefore omitted. For example, in some embodiments, method 400 is a method of at least identifying the set of servers 232 in one or more edge data centers (e.g., edge location 230).

In some embodiments, FIG. 4 is a flowchart of a method of operating system 100 of FIG. 1 or device 201 of FIG. 2, and similar detailed description is therefore omitted. It is understood that additional operations may be performed before, during, and/or after the method 400 depicted in FIG. 4, and that some other operations may only be briefly described herein. In some embodiments, other order of operations of method 400 is within the scope of the present disclosure. In some embodiments, one or more operations of method 400 are not performed.

Method 400 includes exemplary operations, but the operations are not necessarily performed in the order shown. Operations may be added, replaced, changed order, and/or eliminated as appropriate, in accordance with the spirit and scope of disclosed embodiments. It is understood that method 400 utilizes features of one or more of system 100, method 300 or application package configuration 400.

In operation S401 of method 400, point of entry details 408 of switch 228 are received from the database storage device 206. In some embodiments, the point of entry details 408 of switch 228 include an IP address of switch 228 and login credentials for the corresponding IP address of switch 228. In some embodiments, the login credentials enable the BMaaS 212 to log into the switch 228. In some embodiments, the point of entry details 408 includes one or more software files useable by device 201 to log into switch 228.

In some embodiments, operations S402-S406 corresponds to discovering the set of servers 232 connected to switch 228.

In operation S402 of method 400, the BMaaS 212 logs into switch 228. In some embodiments, the BMaaS 212 logs into switch 228 based on the log-in credentials provided by database storage device 206.

In operation S403 of method 400, a first set of MAC addresses for a first set of devices is obtained by BMaaS 212. In some embodiments, the first set of devices are one or more of the devices connected to switch 228. In some embodiments, the first set of devices includes the set of servers 232 and one or more non-servers.

In some embodiments, the first set of MAC addresses includes each MAC address of each corresponding device of the first set of devices. In some embodiments, in operation S403, each MAC address of each corresponding device of the first set of devices is obtained.

In operation S404 of method 400, the MAC address of each corresponding server of the set of servers 232 is filtered from the first set of MAC addresses. In operation S404 of method 400, the MAC address of each corresponding server of the set of servers 232 is filtered from the first set of MAC addresses based on a corresponding organizationally unique identifier (OUI) prefix in the first set of MAC addresses.

In some embodiments, for operation S404, the MAC address of each corresponding server of the set of servers 232 is filtered from the first set of MAC addresses by BMaaS 212.

In some embodiments, operation S404 includes obtaining the MAC address of each corresponding server of the set of servers.

In some embodiments, operation S404 includes separating the MAC address of each corresponding server of the set of servers from the MAC address of each corresponding non-server in the first set of devices.

In some embodiments, operation S404 includes obtaining the MAC address of each corresponding server of the set of servers, and discarding the MAC address of each corresponding non-server in the first set of devices.

In operation S405 of method 400, each server's corresponding MAC address is converted by BMaaS 212 into a corresponding internet protocol (IP) address based on an extended unique identifier-64 (EUI-64).

In operation S406 of method 400, the IP address of each corresponding server of the set of servers 232 is stored in BMaaS 212. In some embodiments, at least the IP address of each corresponding server of the set of servers 232 is stored in BMaaS 212 as SKU BMC details 410.

The SKU BMC details 410 includes one or more software files useable by device 201 to automatically detect at least the set of servers 232. In some embodiments, the SKU BMC details 410 includes the IP address of each corresponding server of the set of servers 232. In some embodiments, the SKU BMC details 410 includes the IP address of each corresponding server of the set of servers 232, and the corresponding MAC address of each corresponding server of the set of servers 232. Other types of data are included within the SKU BMC details 410.

In some embodiments, the SKU BMC details 410 has a standardized format useable by the BMaaS 212 to automatically detect at least the set of servers 232 in an efficient manner. For example, the use of the standardized format of the SKU BMC details 410 ensures that version mismatch between different files in the SKU BMC details 410 is avoided. In some embodiments, the SKU BMC details 410 has a known directory structure, and BMaaS 212 is able to extract the relevant information from the SKU BMC details 410, and each piece of information in the SKU BMC details 410 is able to be utilized by BMaaS 212 in an efficient manner.

In some embodiments, one or more of the operations of method 400 is not performed. By utilizing method 400, one or more elements of system 100 or 200 is configured to achieve the benefits discussed above with respect to system 100 or 200 and method 300.

Figure 5:
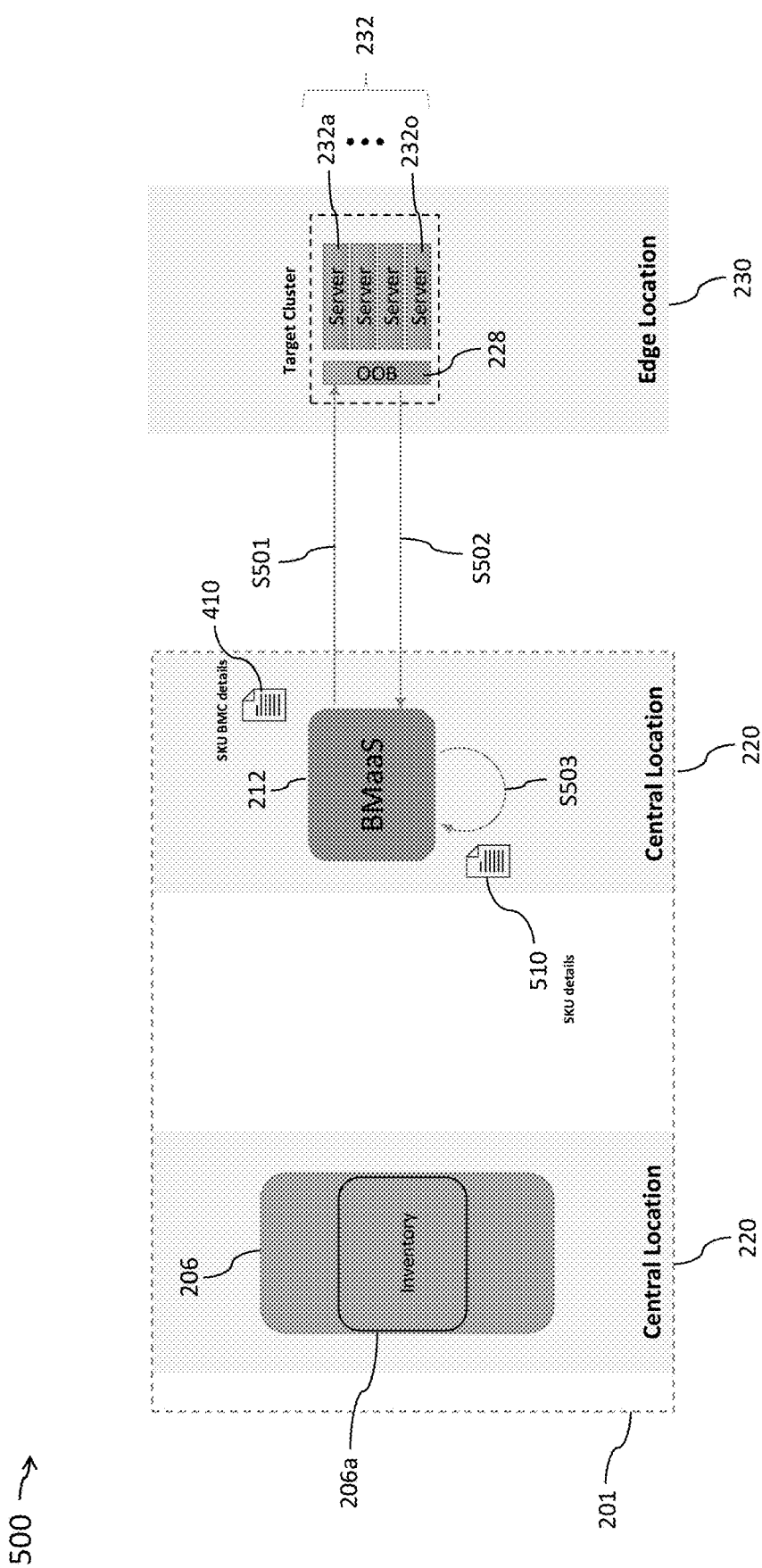
FIG. 5 is a flowchart of a method, in accordance with some embodiments.

FIG. 5 is a flowchart of a method 500, in accordance with some embodiments.

Method 500 is an embodiment of at least operation S302 of method 300 of FIGS. 2 and 3, and similar detailed description is therefore omitted. For example, in some embodiments, method 400 is a method of at least discovering the details of a plurality of components of each corresponding server of the set of servers 232.

In some embodiments, FIG. 5 is a flowchart of a method of operating system 100 of FIG. 1 or device 201 of FIG. 2, and similar detailed description is therefore omitted. It is understood that additional operations may be performed before, during, and/or after the method 500 depicted in FIG. 5, and that some other operations may only be briefly described herein. In some embodiments, other order of operations of method 500 is within the scope of the present disclosure. In some embodiments, one or more operations of method 500 are not performed.

In operation S501 of method 500, each server of the set of servers 232 is logged into by the BMaaS 212 based on the corresponding IP address of each server of the set of servers 232 using a first API. In some embodiments, the first API includes REDFISH. Other APIs for the first API are within the scope of the present disclosure.

In some embodiments, when the BMaaS 212 logs into each server of the set of servers 232 using the first API includes the BMaaS 212 logging into the BMC console of each server of the set of servers 232 server using the corresponding IP address of the BMC and the corresponding credentials), and then using the first API to fetch information about the internal components of each server of the set of servers 232. In some embodiments, each server of the set of servers 232 is logged into by the BMaaS 212 based on the corresponding IP address of each server of the set of servers 232 based on the SKU BMC details 410.

In operation S502 of method 500, the details of the plurality of components of each corresponding server of the first set of servers is obtained by the BMaaS 212. In some embodiments, the details of the plurality of components includes at least memory, hard drive disk, peripheral component interconnect express (PCIe) devices, redundant array of independent disks (RAID), central processing unit (CPU), power supply units (PSUs), basic input output system (BIOS), network interface cards (NIC), fans, or field programmable gate array (FPGA).

In operation S503 of method 500, the details of the plurality of components of each corresponding server of the set of servers 232 is stored in BMaaS 212. In some embodiments, at least the details of the plurality of components of each corresponding server of the set of servers 232 is stored in BMaaS 212 as SKU details 510.

The SKU details 510 includes one or more software files. In some embodiments, the SKU details 510 includes the details of the plurality of components of each corresponding server of the set of servers 232. In some embodiments, the SKU details 510 includes the details of the plurality of components of each corresponding server of the set of servers 232, and the corresponding server of the set of servers 232. Other types of data are included within the SKU details 510.

In some embodiments, the SKU details 510 has a standardized format useable by the BMaaS 212. In some embodiments, the SKU details 510 has a known directory structure, and BMaaS 212 is able to extract the relevant information from the SKU details 510, and each piece of information in the SKU details 510 is able to be utilized by BMaaS 212 in an efficient manner.

In some embodiments, one or more of the operations of method 500 is not performed. By utilizing method 500, one or more elements of system 100 or 200 is configured to achieve the benefits discussed above with respect to system 100 or 200 and method 300.

FIG. 6 is a diagram of SKU details 600, in accordance with some embodiments.

SKU details 600 is an embodiment of SKU details 510, and similar detailed description is omitted.

SKU details 600 includes memory 602, hard drive disk 604, PCIe devices 606, RAID 608, CPU 610, PSU 612, and BIOS 614.

Each item in the SKU details 600 includes one or more relevant characteristics discovered by BMaaS 212. In some embodiments, each item in the SKU details 600 includes one or more relevant server component characteristics discovered by system 200.

Memory 602 includes capacity of memory 602, speed (MHz) of memory 602 and status of memory 602.

Hard drive disk 604 includes capacity of hard drive disk 604, MediaType (SSD/HDD) of hard drive disk 604 and status of hard drive disk 604.

PCIe devices 606 includes description of PCIe devices 606, MAC Address of PCIe devices 606, SlotNumber of PCIe devices 606 and VendorId of PCIe devices 606.

RAID 608 includes description of RAID 608 and Status of RAID 608.

CPU 610 includes model of CPU 610, MaxSpeedMHz of CPU 610, TotalCores/Threads of CPU 610 and Status of CPU 610.

PSU 612 includes Model of PSU 612, PowerCapacityWatts of PSU 612 and Status of PSU 612.

BIOS 614 includes Attributes BIOS 614.

Other characteristics discovered by BMaaS 212 for SKU details 600 are within the scope of the present disclosure.

Figure 7:
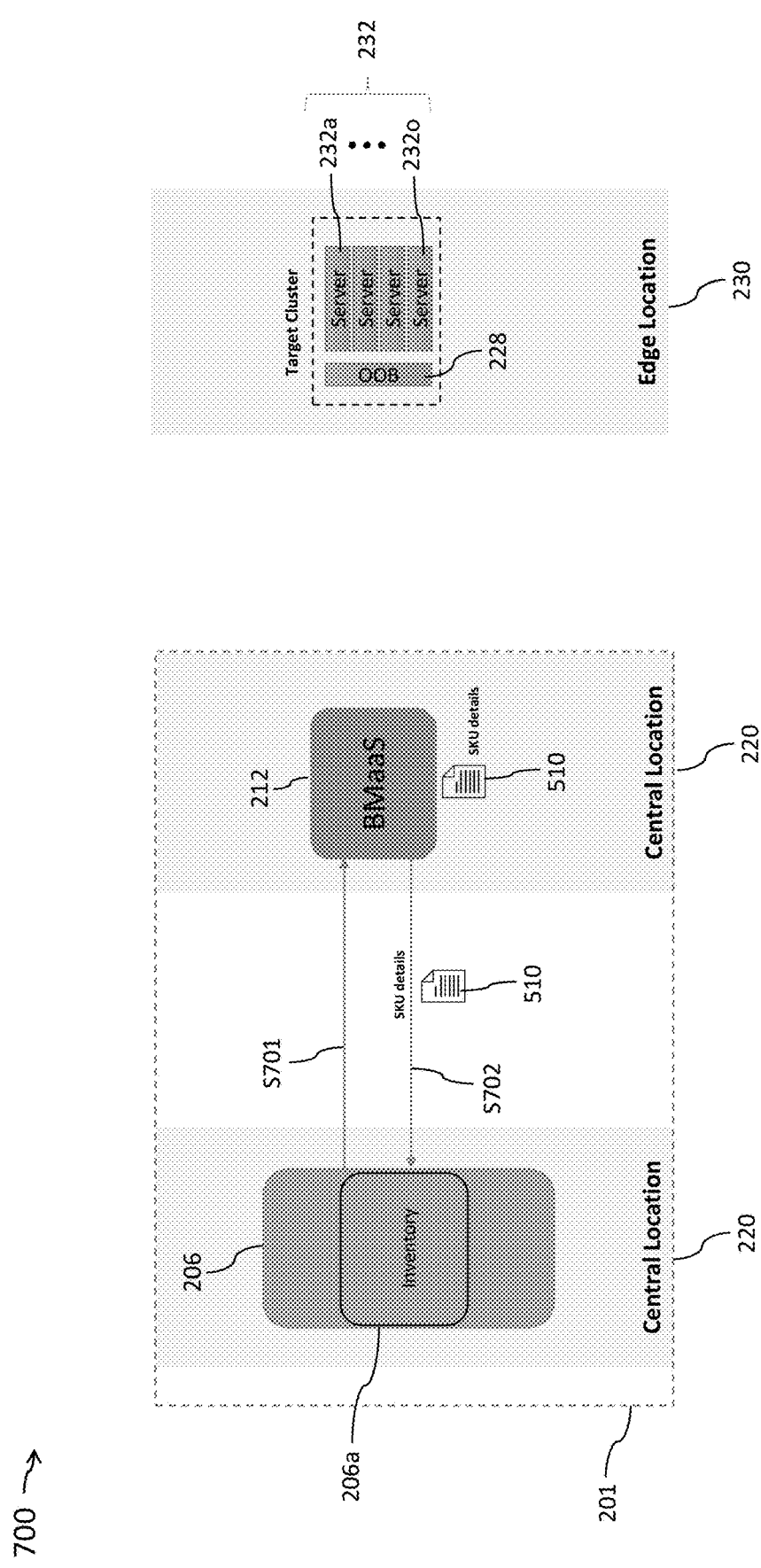
FIG. 7 is a flowchart of a method, in accordance with some embodiments.

FIG. 7 is a flowchart of a method 700, in accordance with some embodiments.

Method 700 is an embodiment of at least operation S303 of method 300 of FIGS. 2 and 3, and similar detailed description is therefore omitted. For example, in some embodiments, method 400 is a method of at least updating inventory 206a of the discovered set of servers 212 and the details of the plurality of components of each corresponding server of the set of servers 232.

In some embodiments, FIG. 7 is a flowchart of a method of operating system 100 of FIG. 1 or device 201 of FIG. 2, and similar detailed description is therefore omitted. It is understood that additional operations may be performed before, during, and/or after the method 700 depicted in FIG. 7, and that some other operations may only be briefly described herein. In some embodiments, other order of operations of method 700 is within the scope of the present disclosure. In some embodiments, one or more operations of method 700 are not performed.

In operation S701 of method 700, automatic polling requests are received by BMaaS 212. In some embodiments, the automatic polling requests are sent from inventory 206a.

In some embodiments, the automatic polling requests are sent from inventory 206a, thereby requesting that BMaaS 212 provide an update for inventory 206a on the discovered set of servers 212 and the details of the plurality of components of each corresponding server of the set of servers 232.

In some embodiments, the automatic polling requests are sent on a daily basis. In some embodiments, the automatic polling requests are sent on a weekly basis. In some embodiments, the automatic polling requests are sent on an hourly basis. In some embodiments, the automatic polling requests are sent on a real-time basis. Other time periods are within the scope of the present disclosure for the automatic polling requests.

In operation S702 of method 700, inventory 206a is updated by BMaaS 212 by a second API. In some embodiments, inventory 206a is updated by BMaaS 212 in response to the polling request received by BMaaS 212.

In some embodiments, inventory 206a is updated by BMaaS 212 sending the SKU details 510 to inventory 206a in response to the automatic polling request of operation S701. In some embodiments, the SKU details include the details of the plurality of components of each corresponding server of the set of servers 232 discovered by BMaaS 212 in response to the automatic polling request.

In some embodiments, inventory 206a is updated by BMaaS 212 sending the entirety of the SKU details 510 to inventory 206a in response to the automatic polling request of operation S701. In some embodiments, inventory 206a is updated by BMaaS 212 sending the changes of the SKU details 510 to inventory 206a since the last update sent by BMaaS 212 to inventory 206a.

In some embodiments, one or more of the operations of method 700 is not performed. By utilizing method 700, one or more elements of system 100 or 200 is configured to achieve the benefits discussed above with respect to system 100 or 200 and method 300.

Figure 8:
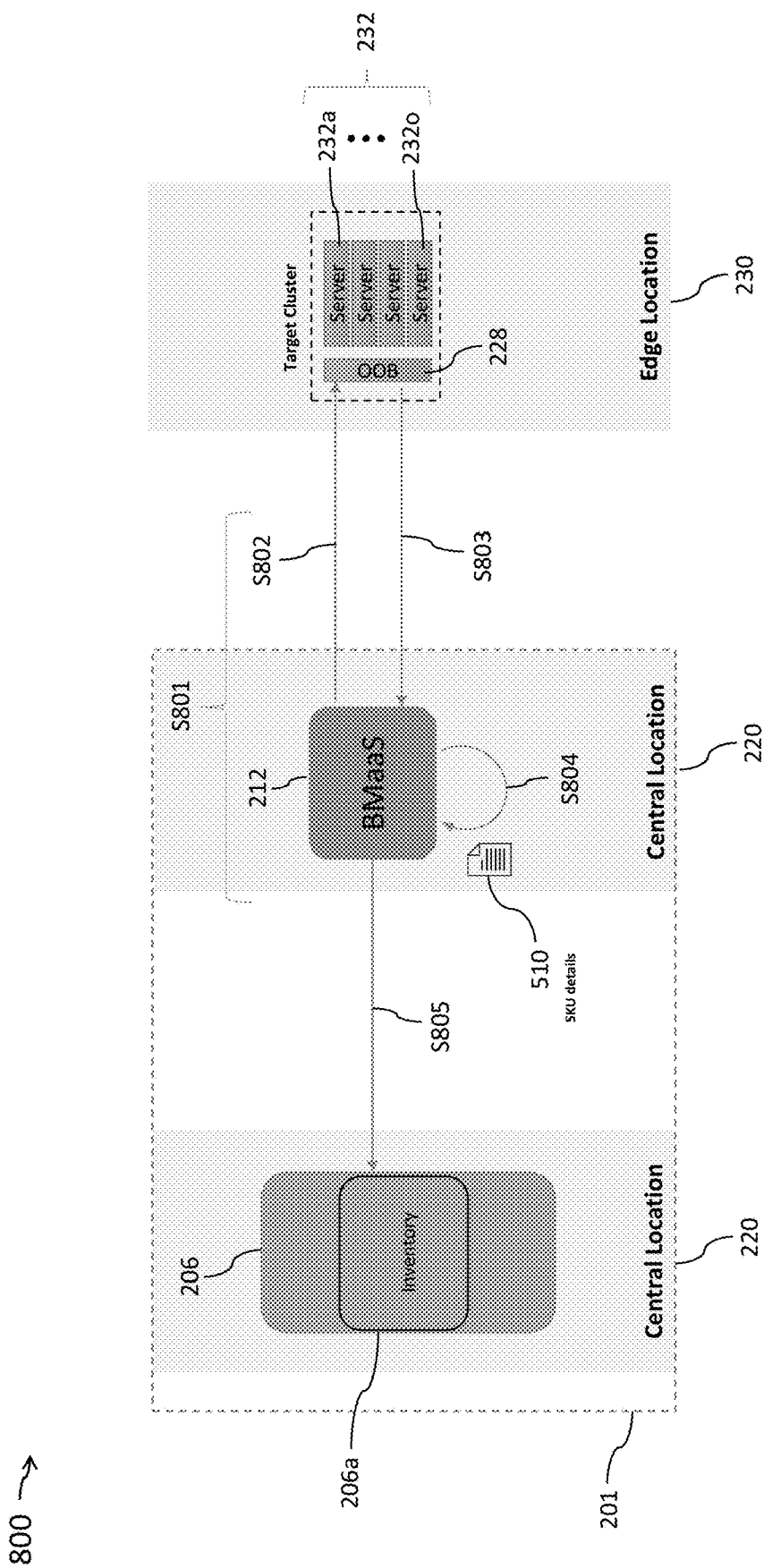
FIG. 8 is a flowchart of a method, in accordance with some embodiments.

FIG. 8 is a flowchart of a method 800, in accordance with some embodiments.

Method 800 is an embodiment of at least operation S304 of method 300 of FIGS. 2 and 3, and similar detailed description is therefore omitted. For example, in some embodiments, method 400 is a method of at least performing health checks on the set of servers 232 according to a health check frequency by BMaaS 212.

In some embodiments, FIG. 8 is a flowchart of a method of operating system 100 of FIG. 1 or device 201 of FIG. 2, and similar detailed description is therefore omitted. It is understood that additional operations may be performed before, during, and/or after the method 800 depicted in FIG. 8, and that some other operations may only be briefly described herein. In some embodiments, other order of operations of method 800 is within the scope of the present disclosure. In some embodiments, one or more operations of method 800 are not performed.

In operation S801 of method 800, periodic reconciliation of the plurality of components of each corresponding server of the set of servers 232 is periodically performed by BMaaS 212 in a first time period. In some embodiments, the first time period corresponds to the health check frequency of at least method 300.

In some embodiments, operation S801 includes periodically determining whether any changes occurred to the set of servers 232 or the components inside the set of servers 232 within the first time period, and if any changes occurred to the set of servers 232 or the components inside set of servers 232 within the first time period, then BMaaS 212 is updated of at least the changes.

In some embodiments, operation S801 includes at least operation S802, S803 or S804. For example, in some embodiments, the performing the periodic reconciliation of the plurality of components of each corresponding server of the set of servers 212 includes at least operation S802, S803 or S804.

In operation S802 of method 800, each server of the set of servers 232 is logged into by BMaaS 212 based on the corresponding IP address of each server of the set of servers 232 using the first API. In some embodiments, operation S802 corresponds to operation S501 of method 500 of FIG. 5, and similar detailed description is therefore omitted.

In operation S803 of method 800, at least the updated details of the plurality of components of each corresponding server of the set of servers 232 is obtained by the BMaaS 212.

In some embodiments, in operation S803, the BMaaS 212 is configured to obtain any changes detected by BMaaS 212. For example, in some embodiments, in operation S803, each of the details of the plurality of components of each corresponding server of the set of servers 232 is obtained by the BMaaS 212, which includes the updated details and the non-updated details.

In some embodiments, operation S803 corresponds to operation S502 of method 500 of FIG. 5, and similar detailed description is therefore omitted.

In operation S804 of method 800, at least the updated details of the plurality of components of each corresponding server of the set of servers 232 is stored in the BMaaS 212 as SKU details 510.

In some embodiments, in operation S803, the BMaaS 212 is configured to obtain any changes detected by BMaaS 212, and therefore the updated details and the non-updated details of the plurality of components of each corresponding server of the set of servers 232 is stored in the BMaaS 212 as SKU details 510.

In some embodiments, operation S804 corresponds to operation S503 of method 500 of FIG. 5, and similar detailed description is therefore omitted.

In operation S805 of method 800, at least the updated details of the plurality of components of each corresponding server of the set of servers 232 is updated in inventory 206a by BMaaS 212.

In some embodiments, operation S805 corresponds to operation S702 of method 700 of FIG. 7, and similar detailed description is therefore omitted.

In some embodiments, inventory 206a is updated by BMaaS 212 sending the entirety of the SKU details 510 to inventory 206a in operation S805. In some embodiments, inventory 206a is updated by BMaaS 212 sending the changes of the SKU details 510 to inventory 206a since the last update sent by BMaaS 212 to inventory 206a in operation S805.

In some embodiments, one or more of the operations of method 800 is not performed. By utilizing method 800, one or more elements of system 100 or 200 is configured to achieve the benefits discussed above with respect to system 100 or 200 and method 300.

FIG. 9 is a flowchart of a method 900A of operating a system 900B, in accordance with some embodiments.

For brevity, FIG. 9 includes both method 900A and system 900B. In some embodiments, FIG. 9 is a flowchart of a method 900A of operating system 900B.

FIG. 9 shows a series of steps or operations (e.g., S901, S902, S903, S904, S905, S906 and S907), performed by system 900B, and are described as method 900A.

Method 900A is an embodiment of at least operation S304 of method 300 of FIGS. 2 and 3, and similar detailed description is therefore omitted. For example, in some embodiments, method 400 is a method of at least performing health checks on the set of servers 232 according to a health check frequency by BMaaS 212.

System 900B is an embodiment of system 200 of FIG. 2, and similar detailed description is therefore omitted. System 900B is a variation of system 200, and similar detailed description is therefore omitted. In comparison with system 200, system 900B includes device 901 instead of device 201.

Device 901 is a variation of device 201, and similar detailed description is therefore omitted. In comparison with device 201, device 901 further includes observability framework (OBF) 902.

Observability framework (OBF) 902 is a tool stored in unit 901. In some embodiments, OBF 902 is stored in a unit separate from unit 901. OBF 902 is configured to monitor one or more applications that are deployed in at least the set of servers 232. In some embodiments, OBF 216 is configured to provide status updates to other portions of system 900, such as BMaaS 212, inventor 206a or an orchestrator, such as orchestrator 1102 as shown in FIG. 11.

In some embodiments, FIG. 9 is a flowchart of a method of operating system 100 of FIG. 1 or device 201 of FIG. 2, and similar detailed description is therefore omitted. It is understood that additional operations may be performed before, during, and/or after the method 900A depicted in FIG. 9, and that some other operations may only be briefly described herein. In some embodiments, other order of operations of method 900A is within the scope of the present disclosure. In some embodiments, one or more operations of method 900A are not performed.

In operation S901 of method 900A, alert-based reconciliation of the plurality of components of each corresponding server of the set of servers 232 is performed by BMaaS 212 in a first time period in real-time. In some embodiments, the first time period corresponds to the health check frequency of at least method 300.

In some embodiments, operation S901 includes determining whether any changes occurred to the set of servers 232 or the components inside the set of servers 232 within the first time period in real-time, and if any changes occurred to the set of servers 232 or the components inside set of servers 232 within in real-time within the first time period, then BMaaS 212 is updated of at least the changes.

In some embodiments, operation S901 includes at least operation S902, S903, S904, S905, S906 or S907. For example, in some embodiments, the performing the alert-based reconciliation of the plurality of components of each corresponding server of the set of servers 212 includes at least operation S902, S903, S904, S905, S906 or S907.

In operation S902 of method 900A, events of the set of servers 232 are monitored by OBF 902. In some embodiments, the events include at least fault events, performance events, logging events and inventory update events.

In operation S903 of method 900A, the events are published by OBF 902 over a Kafka interface to the BMaaS 212. In some embodiments, the events are published by OBF 902 over an interface different from the Kafka interface.

In operation S904 of method 900A, the inventory update events are filtered from the events. In some embodiments, the inventory update events are filtered by BMaaS 212. In some embodiments, the inventory update events are filtered by BMaaS 212 by comparing the inventory update events with the events. In some embodiments, the inventory update events are stored by BMaaS 212 and the non-inventory update events in the events are discarded.

In some embodiments, the inventory update events include at least updating one or more components in the plurality of components of each corresponding server of the set of servers 212. In some embodiments, the inventory update events include at least changing or replacing one or more components in the plurality of components of each corresponding server of the set of servers 212. In some embodiments, the inventory update events include at least adding one or more components in the plurality of components of each corresponding server of the set of servers 212.

In some embodiments, the inventory update events include at least detecting a removal of a server from the set of servers 232, detecting an addition of a server to the set of servers 232, detecting the addition of a new component in a server of the set of servers 232, or detecting the replacement of a failed component in a server of the set of servers 232 in response to detecting a failure of the failed component.

In operation S905 of method 900A, which servers of the set of servers 232 or data centers that have been updated are identified by the BMaaS 212 based on the inventory update events that are filtered in operation S904.

In operation S906 of method 900A, at least updated details of the plurality of components of each corresponding server of the set of servers 232 or updated data centers are discovered by the BMaaS 212 based on the inventory update events.

In some embodiments, operation S906 corresponds to method 500 of FIG. 5, and similar detailed description is therefore omitted. In some embodiments, operation S906 corresponds to at least operations S501, S502 or S503 of method 500, and similar detailed description is therefore omitted. In some embodiments, in operation S906 of method 900, at least the updated details of the plurality of components of each corresponding server of the set of servers 232 or updated data centers is updated in the SKU details 510 by BMaaS 212.

In operation S907 of method 900A, at least the updated details of the plurality of components of each corresponding server of the set of servers 232 or updated data centers is updated in inventory 206a by BMaaS 212.

In some embodiments, operation S907 corresponds to operation S702 of method 700 of FIG. 7, and similar detailed description is therefore omitted.

In some embodiments, inventory 206a is updated by BMaaS 212 sending the entirety of the SKU details 510 to inventory 206a in operation S907. In some embodiments, inventory 206a is updated by BMaaS 212 sending the changes of the SKU details 510 to inventory 206a since the last update sent by BMaaS 212 to inventory 206a in operation S907.

In some embodiments, one or more of the operations of method 900A is not performed. By utilizing method 900A, one or more elements of system 100, 200 or 900B is configured to achieve the benefits discussed above with respect to system 100 or 200 and method 300.

FIG. 10 is a flowchart of a method 1000A of operating a system 1000B, in accordance with some embodiments.

For brevity, FIG. 10 includes both method 1000A and system 1000B. In some embodiments, FIG. 9 is a flowchart of a method 1000A of operating system 1000B.

FIG. 10 shows a series of steps or operations (e.g., S1001, S1002, S1003, S1004 and S1005), performed by system 1000B, and are described as method 1000A.

Method 1000A is an embodiment of at least a user 1002 using a data center construction tool 1004 within system 1000B. For example, in some embodiments, method 1000A is a method of at least user 1002 using the data center construction tool 1004 to add servers to a data center location, and updating inventory 206a of the added servers. In some embodiments, the servers added to the data center location (e.g., edge location 230) correspond to the set of servers 232. In some embodiments, method 1000A occurs prior to at least method 300, 400, 500 700, 800 or 900, and similar detailed description is omitted.

System 1000B is an embodiment of system 200 of FIG. 2, and similar detailed description is therefore omitted. System 1000B is a variation of system 200, and similar detailed description is therefore omitted. In comparison with system 200, system 1000B includes device 1001 instead of device 201.

Device 1001 is a variation of device 201, and similar detailed description is therefore omitted. In comparison with device 201, device 1001 further includes data center construction tool 1004. For ease of illustration, device 1001 does not show BMaaS 212, but BMaaS 212 is also included as part of device 1001.

Data center construction tool 1004 is stored in unit 1001. Data center construction tool 1004 is used by user 1002 to add servers to edge location 230. Data center construction tool 1004 is configured to update inventory 206a of the added servers. In some embodiments, data center construction tool 1004 is configured to receive a first scanned server information 1010 from the edge location 230, and to send a second scanned server information to inventory 206a. In some embodiments, the second scanned server information includes the first scanned server information 1010.

In some embodiments, data center construction tool 1004 is stored in a unit separate from unit 1001.

In some embodiments, FIG. 10 is a flowchart of a method of operating system 100 of FIG. 1 or device 201 of FIG. 2, and similar detailed description is therefore omitted. It is understood that additional operations may be performed before, during, and/or after the method 1000A depicted in FIG. 10, and that some other operations may only be briefly described herein. In some embodiments, other order of operations of method 1000A is within the scope of the present disclosure. In some embodiments, one or more operations of method 1000A are not performed.

In operation S1001 of method 1000A, user 1002 scans the bar code pasted on each server of the set of servers 232 using a bar code scanner to obtain scanned information.

In operation S1002 of method 1000A, the scanned information is sent to the data center construction tool 1004 as the first scanned information 1010. In some embodiments, the first scanned information 1010 is sent by user 1002 to the data center construction tool 1004. In some embodiments, the first scanned information 1010 is sent by the set of servers 232 to the data center construction tool 1004.

In some embodiments, the first scanned information 1010 includes server information of each server of the set of servers 232. In some embodiments, the first scanned information 1010 is a spreadsheet file.

In operation S1003 of method 1000A, user 1002 confirms that each server in the set of servers 232 has been scanned, user 1002 opens an Application (hereinafter referred to as an "APP") of the data center construction tool 1004, and user 1002 submits data center related information in a form of the APP of the data center construction tool 1004. In some embodiments, the data center related information corresponds to the first scanned information 1010. In some embodiments, the data center related information corresponds to the second scanned information (described below).

In some embodiments, operation S1003 further includes user 1002 clicking on a data center construction complete option within the APP of the data center construction tool 1004.

In operation S1004 of method 1000A, an API call is made to inventory 206a to submit or send the complete inventory information to inventory 206a. In some embodiments, operation S1004 is executed in response to the data center construction complete option being checked within the APP of the data center construction tool 1004.

In some embodiments, the complete inventory information corresponds to the second scanned server information. In some embodiments, the second scanned server information includes at least Data Center Code, prefecture of the data center, latitude of the data center, longitude of the data center, data center type, location_id of the data center, region of the data center, address of the data center, what floors the data center is located on, what rooms the data center is located in what racks are included in the data center, or the IP address/addresses of the 00B switch (e.g., switch 228) of the data center.

In operation S1005 of method 1000A, inventory 206a sends an acknowledgement response to the center construction tool 1004 in response to successfully receiving the complete inventory information from inventory 206a. In some embodiments the acknowledgment response acknowledges that inventory 206a has been successfully updated with the complete inventory information.

In some embodiments, one or more of the operations of method 1000A is not performed. By utilizing method 1000A, one or more elements of system 100, 200 or 1000B is configured to achieve the benefits discussed above with respect to system 100 or 200 and method 300.

FIG. 11 is a flowchart of a method 1100A of operating a system 1100B, in accordance with some embodiments.

For brevity, FIG. 11 includes both method 1100A and system 1100B. In some embodiments, FIG. 11 is a flowchart of a method 1100A of operating system 1100B.

FIG. 11 shows a series of steps or operations (e.g., S1101, S1102, S1103 and S1104), performed by system 1100B, and are described as method 1100A.

Method 1100A is an embodiment of at least operation S304 of method 300 of FIGS. 2 and 3, and similar detailed description is therefore omitted. For example, in some embodiments, method 400 is a method of at least performing health checks on the set of servers 232 according to a health check frequency by BMaaS 212. In some embodiments, method 1100A is an embodiment of one or more uses of inventory 206a in system 1100B.

System 1100B is an embodiment of system 200 of FIG. 2, and similar detailed description is therefore omitted. System 1100B is a variation of system 900B of FIG. 9, and similar detailed description is therefore omitted. In comparison with system 900B of FIG. 9, system 1100B includes device 1101 instead of device 901.

Device 1101 is a variation of device 901, and similar detailed description is therefore omitted. In comparison with device 901, device 1101 further includes an orchestrator 1102.

Orchestrator 1102 is a tool stored in unit 1101. In some embodiments, orchestrator 1102 is stored in a unit separate from unit 1101. Orchestrator 1102 is configured to automatically provision and to automatically deploy one or more software applications on at least the set of target servers 232. Orchestrator 1102 is also referred to as an end-to-end orchestrator (E2EO). In some embodiments, orchestrator 1102 is configured to provide automatic end-to-end orchestration, configuration and management of the one or more software applications on at least the set of target servers 232. In some embodiments, the automatic end-to-end orchestration, deployment, configuration and management of each software application is characterized as a corresponding workflow. Orchestrator 1102 is configured to provide automatic end-to-end orchestration, deployment, configuration and management of each software application as a corresponding workflow, and provides user 1002 with each corresponding state of the automatic end-to-end orchestration, deployment, configuration and management for each software application or workflow.

Device 1101 includes inventory 206a, OBF tool 902, orchestrator 1102 and BMaaS 212. For ease of illustration, device 1101 does not show BMaaS 212, but BMaaS 212 is also included as part of device 1101. For ease of illustration, FIG. 11 does not show device 1101 coupled to the switch 228 and the set of servers 232, but device 1101 is coupled to switch 228 and the set of servers 232 in a manner similar to that shown in at least FIGS. 2 and 9, and similar detailed description is omitted.

In some embodiments, FIG. 11 is a flowchart of a method of operating system 100 of FIG. 1 or device 201 of FIG. 2, and similar detailed description is therefore omitted. It is understood that additional operations may be performed before, during, and/or after the method 1100A depicted in FIG. 11, and that some other operations may only be briefly described herein. In some embodiments, other order of operations of method 1100A is within the scope of the present disclosure. In some embodiments, one or more operations of method 1100A are not performed.

In operation S1101 of method 1100A, user 1002 opens one or more inventory dashboards in inventory 206a for complete network inventory information. In some embodiments, the inventory dashboards in inventory 206a includes network inventory information 1200A (shown in FIG. 12A), and physical inventory 1200B (shown in FIG. 12B).

In some embodiments, the one or more inventory dashboards of inventory 206a is a single pane of view that shows how many servers of the set of servers 232 are available, how many data centers are available, and how many racks are available in each data center. In some embodiments, multiple panes of view show the inventory dashboard of inventory 206a are within the scope of the present disclosure.

In some embodiments, inventory 206a is a centralized place for all complete network inventory. In some embodiments, network inventory includes physical inventory and logical inventory. In some embodiments, physical inventory includes servers, racks, switches, hardware, or the like. In some embodiments, logical inventory includes software, IP addresses, hostnames, application details, or the like.

In operation S1102 of method 1100A, the OBF tool 902 views inventory 206a to determine which applications have been deployed on which servers in the set of servers 232 or in which data centers.

In some embodiments, the OBF tool 901 is configured to generate one or more alarms when the OBF tool 902 detects any changes in the set of servers 232 or in the data centers (for example as described above in method 900A).

In operation S1103 of method 1100A, application details are stored in inventory 206a by orchestrator 1102 after application deployment.

In operation S1104 of method 1100A, the application details are retrieved by orchestrator 1102 during application upgrades.

In some embodiments, inventory 206a is a centralized place for Orchestrator 1102 to store and retrieve information within inventory 206a.

In some embodiments, inventory 206a is used by at least data center construction tool 1004, Orchestrator 1102 or OBF tool 902 to perform capacity management of the number of data centers or servers in the set of servers 232 to determine whether the corresponding data centers or corresponding servers in the set of servers 232 are underutilized or overutilized. In some embodiments, in response to retrieving information about whether the corresponding data centers or corresponding servers in the set of servers 232 are underutilized or overutilized, the corresponding data centers or corresponding servers in the set of servers 232 can be changed as discussed above in at least operation S304 of method 300.

In some embodiments, one or more of the operations of method 1100A is not performed. By utilizing method 1100A, one or more elements of system 100, 200 or 1100B is configured to achieve the benefits discussed above with respect to system 100 or 200 and method 300.

FIG. 12A is a diagram of a network inventory information 1200A, in accordance with some embodiments.

In some embodiments, network inventory information 1200A is viewable by user 1002 by way of a user interface (e.g., user interface 1324 in FIG. 13), and is displayed by system 1300.

The network inventory information 1200A is a visual representation of the inventory dashboards of inventory 206a of method 1100A of FIG. 11 for each data center.

The network inventory information 1200A includes table 1201a. The network inventory information 1200A displays table 1201a. Table 1201a is an inventory of each of the data centers of at least method 300, 400, 500, 700, 800, 900A, 1000A or 1100A.

With the exception of row 1, each row in table 1201a is an instance object, and is created in database storage device 206, and is updated each time during method 300 of FIG. 3.

Table 1201a includes data center numbers, the data center name of each corresponding data center, the corresponding status of each corresponding data center, and the location of each corresponding data center.

Table 1201a comprises 6 rows and 4 columns. Column 1 comprises data center numbers. In some embodiments, the data center numbers of table 1201a are useable to identify the corresponding data center. Column 2 comprises a data center name of each corresponding data center in column 1. Column 3 comprises a data center status of each corresponding data center in column 1. Column 4 comprises a data center location of each corresponding data center in column 1. Row 1 corresponds to the title fields of table 1201a.

Each entry in column 1 has a corresponding entry in column 2, a corresponding entry in column 3, and a corresponding entry in column 4.

In some embodiments, each entry in row 2, 3, 4, 5 or 6 corresponds to the edge location 230.

Table 1201a is utilized with one or more operations of method 300 of FIG. 3, method 400 of FIG. 4, method 500 of FIG. 5, method 700 of FIG. 7, method 800 of FIG. 8, method 900A of FIG. 9, method 1000A of FIG. 10 or method 1100A of FIG. 11.

Figure 13:
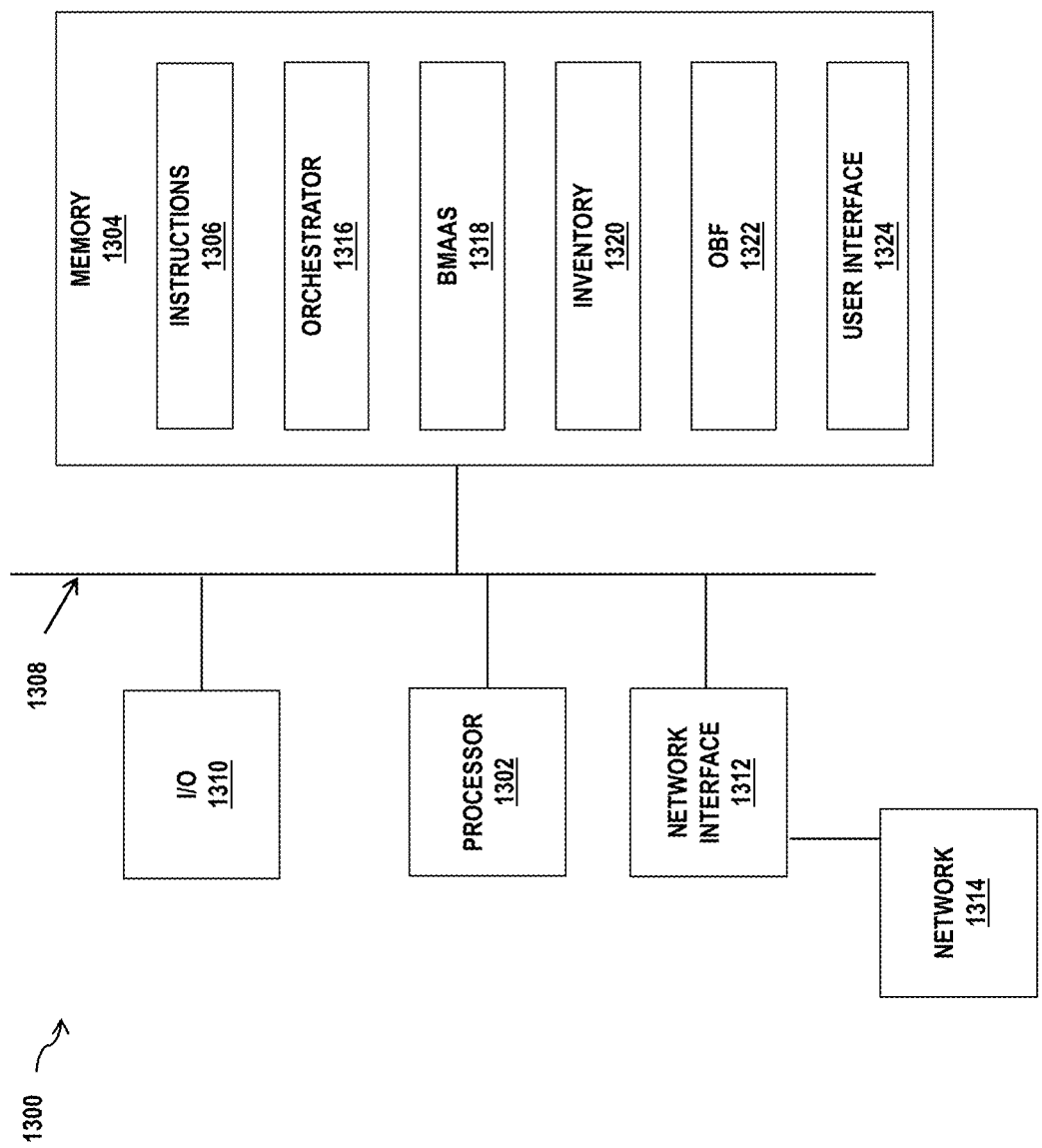
FIG. 13 is a schematic view of a system, in accordance with some embodiments.

In some embodiments, table 1201a is stored in memory 1304 of FIG. 13. In some embodiments, table 1301a is generated by system 1300 of FIG. 13.

Other numbers of columns, other numbers of rows, or other types of data in table 1201a are within the scope of the present disclosure.

In some embodiments, network inventory information 1200A is a graphical user interface that facilitates customization or creation of inventory 206a by way of dragging and dropping one or more objects displayed in the graphical user interface. In some embodiments, user interface is accessible by way of a user terminal (e.g., device 102a). In some embodiments, one or more entries or rows in table 1201a are selected by user 1102 to view further details of the automatic discovery of the set of servers 232 and the updating of inventory 206a.

In some embodiments, network inventory information 1200A makes it possible to create one or more sets of servers at a new data center. In some embodiments, network inventory information 1200A makes it possible to modify one or more existing sets of servers 232 at an existing or a new data center.

In some embodiments, network inventory information 1200A makes it possible to track and add or remove one or more components in the set of servers 232. In some embodiments, the selection or creation of one or more data centers in the network inventory information 1200A makes it possible for user 1102 to view the one or more existing or new data centers.

FIG. 12B is a diagram of physical inventory 1200B, in accordance with some embodiments.

In some embodiments, physical inventory 1200B is viewable by user 1002 by way of a user interface (e.g., user interface 1324 in FIG. 13), and is displayed by system 1300.

The physical inventory 1200B is a visual representation of the physical inventory (such as inventory 206a of method 1100A of FIG. 11) for each data center.

The physical inventory 1200B includes table 1201b. The physical inventory 1200B displays table 1201b. Table 1201b is an inventory of each of the data centers of at least method 300, 400, 500, 700, 800, 900A, 1000A or 1100A.

With the exception of row 1, each row in table 1201b is an instance object, and is created in database storage device 206, and is updated each time during method 300 of FIG. 3.

Table 1201b includes server numbers, the server name of each corresponding server, and the corresponding status of each corresponding server.

Table 1201b comprises 6 rows and 3 columns. Column 1 comprises server numbers. In some embodiments, the server numbers of table 1201b are useable to identify the corresponding server. Column 2 comprises a server name of each corresponding server in column 1. Column 2 comprises a server status of each corresponding server in column 1. Row 1 corresponds to the title fields of table 1201b.

Each entry in column 1 has a corresponding entry in column 2 and a corresponding entry in column 3. In some embodiments, each entry in row 2, 3, 4, 5 or 6 corresponds to the edge location 230.

Table 1201b is utilized with one or more operations of method 300 of FIG. 3, method 400 of FIG. 4, method 500 of FIG. 5, method 700 of FIG. 7, method 800 of FIG. 8, method 900A of FIG. 9, method 1000A of FIG. 10 or method 1100A of FIG. 11.

In some embodiments, table 1201b is stored in memory 1304 of FIG. 13. In some embodiments, table 1301a is generated by system 1300 of FIG. 13.

Other numbers of columns, other numbers of rows, or other types of data in table 1201b are within the scope of the present disclosure.

In some embodiments, physical inventory 1200B is a graphical user interface that facilitates customization or creation of inventory 206a by way of dragging and dropping one or more objects displayed in the graphical user interface. In some embodiments, user interface is accessible by way of a user terminal (e.g., device 102a). In some embodiments, one or more entries or rows in table 1201b are selected by user 1102 to view further details of the automatic discovery of the set of servers 232 and the updating of inventory 206a.

In some embodiments, physical inventory 1200B makes it possible to create one or more sets of servers at a new data center. In some embodiments, physical inventory 1200B makes it possible to modify one or more existing sets of servers 232 at an existing or a new data center.

In some embodiments, physical inventory 1200B makes it possible to track and add or remove one or more components in the set of servers 232. In some embodiments, the selection or creation of one or more data centers in the physical inventory 1200B makes it possible for user 1102 to view the one or more existing or new data centers.

FIG. 13 is a schematic view of a system 1300, in accordance with some embodiments.

In some embodiments, system 1300 is an embodiment of system 201 of FIG. 2, and similar detailed description is therefore omitted.

In some embodiments, system 1300 is an embodiment of one or more elements in system 201, 901, 1001 or 1101, and similar detailed description is therefore omitted. For example, in some embodiments, system 1300 is an embodiment of one or more of BMaaS 212, data center planning tool 1004, orchestrator 1102, inventory 206a, database storage device 206 or OBF tool 902, and similar detailed description is therefore omitted.

In some embodiments, system 1300 is an embodiment of one or more devices 102 in FIG. 1, and similar detailed description is therefore omitted.

In some embodiments, system 1300 is an embodiment of one or more edge devices 106 in FIG. 1 or one or more servers of the set of servers 232, and similar detailed description is therefore omitted.

In some embodiments, system 1300 is configured to perform one or more operations of method 300, method 400, method 500, method 700, method 800, method 900A, method 1000A or method 1100A.

System 1300 includes a hardware processor 1302 and a non-transitory, computer readable storage medium 1304 (e.g., memory 1304) encoded with, i.e., storing, the computer program code 1306, i.e., a set of executable instructions 1306. Computer readable storage medium 1304 is configured for interfacing with at least devices 102 in FIG. 1, edge devices 106 in FIG. 1, systems 201, 901, 1101 and 1201, BMaaS 212, data center planning tool 1004, orchestrator 1102, inventory 206a, database storage device 206 or OBF tool 902.

The processor 1302 is electrically coupled to the computer readable storage medium 1304 by a bus 1308. The processor 1302 is also electrically coupled to an I/O interface 1310 by bus 1308. A network interface 1312 is also electrically connected to the processor 1302 by bus 1308. Network interface 1312 is connected to a network 1314, so that processor 1302 and computer readable storage medium 1304 are capable of connecting to external elements by network 1314. The processor 1302 is configured to execute the computer program code 1306 encoded in the computer readable storage medium 1304 in order to cause system 1300 to be usable for performing a portion or all of the operations as described in at least method 300, method 400, method 500, method 700, method 800, method 900A, method 1000A or method 1100A. In some embodiments, network 1314 is not part of system 1300. In some embodiments, network 1314 is an embodiment of network 104 or 108 of FIG. 1.

In some embodiments, the processor 1302 is a central processing unit (CPU), a multi-processor, a distributed processing read circuit, an application specific integrated circuit (ASIC), and/or a suitable processing unit.

In some embodiments, the computer readable storage medium 1304 is an electronic, magnetic, optical, electromagnetic, infrared, and/or a semiconductor read circuit (or apparatus or device). For example, the computer readable storage medium 1304 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 1304 includes a compact disk-read only memory (CD-ROM), a compact disk-read/write (CD-R/W), and/or a digital video disc (DVD).

In some embodiments, forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

In some embodiments, the storage medium 1304 stores the computer program code 1306 configured to cause system 1300 to perform one or more operations of at least method 300, method 400, method 500, method 700, method 800, method 900A, method 1000A or method 1100A. In some embodiments, the storage medium 1304 also stores information used for performing at least method 300, method 400, method 500, method 700, method 800, method 900A, method 1000A or method 1100A as well as information generated during performing at least method 300, method 400, method 500, method 700, method 800, method 900A, method 1000A or method 1100A, such as orchestrator 1316, BMaaS 1318, Inventory 1320, OBF 1322 and user interface 1324, and/or a set of executable instructions to perform one or more operations of at least method 300, method 400, method 500, method 700, method 800, method 900A, method 1000A or method 1100A.

In some embodiments, the storage medium 1304 stores instructions (e.g., computer program code 1306) for interfacing with at least devices 102 in FIG. 1, edge devices 106 in FIG. 1, system 201, orchestrator 1316, keycloak 212, CMaaS 214, OBF tool 1322, or one or more servers of the set of servers 232. The instructions (e.g., computer program code 1306) enable processor 1302 to generate instructions readable by at least devices 102 in FIG. 1, edge devices 106 in FIG. 1, systems 201, 901, 1101 and 1201, BMaaS 212, data center planning tool 1004, orchestrator 1102, inventory 206a, database storage device 206 or OBF tool 902, or one or more servers of the set of servers 232 to effectively implement one or more operations of at least method 300, method 400, method 500, method 700, method 800, method 900A, method 1000A or method 1100A during operation of systems 201, 901, 1001 and 1101.

System 1300 includes I/O interface 1310. I/O interface 1310 is coupled to external circuitry. In some embodiments, I/O interface 1310 includes a keyboard, keypad, mouse, trackball, trackpad, and/or cursor direction keys for communicating information and commands to processor 1302.

System 1300 also includes network interface 1312 coupled to the processor 1302. Network interface 1312 allows system 1300 to communicate with network 1314, to which one or more other computer read circuits are connected. Network interface 1312 includes wireless network interfaces such as BLUETOOTH, WIFI, WIMAX, GPRS, or WCDMA; or wired network interface such as ETHERNET, USB, or IEEE-884. In some embodiments, at least method 300, method 400, method 500, method 700, method 800, method 900A, method 1000A or method 1100A is implemented in two or more systems 1300, and information such as orchestrator, BMaaS, Inventory, OBF and user interface are exchanged between different systems 1300 by network 1314.

System 1300 is configured to receive information related to an orchestrator through I/O interface 1310 or network interface 1312. The information is transferred to processor 1302 by bus 1308, and is then stored in computer readable medium 1304 as orchestrator 1316. In some embodiments, orchestrator 1316 corresponds to orchestrator 1316, and similar detailed description is therefore omitted. System 1300 is configured to receive information related to BMaaS through I/O interface 1310 or network interface 1312. The information is stored in computer readable medium 1304 as BMaaS 1318. In some embodiments, BMaaS 1318 corresponds to BMaaS 212, and similar detailed description is therefore omitted. System 1300 is configured to receive information related to an inventory through I/O interface 1310 or network interface 1312. The information is stored in computer readable medium 1304 as inventory 1320. In some embodiments, inventory 1320 corresponds to inventory 206a, and similar detailed description is therefore omitted. System 1300 is configured to receive information related to an OBF through I/O interface 1310 or network interface 1312. The information is stored in computer readable medium 1304 as OBF 1322. In some embodiments, OBF 1322 corresponds to OBF 902, and similar detailed description is therefore omitted. System 1300 is configured to receive information related to a user interface through I/O interface 1310 or network interface 1312. The information is stored in computer readable medium 1304 as user interface 1324.

In some embodiments, at least method 300, method 400, method 500, method 700, method 800, method 900A, method 1000A or method 1100A is implemented as a standalone software application for execution by a processor. In some embodiments, at least method 300, method 400, method 500, method 700, method 800, method 900A, method 1000A or method 1100A is implemented as corresponding software applications for execution by one or more processors.

In some embodiments, at least method 300, method 400, method 500, method 700, method 800, method 900A, method 1000A or method 1100A is implemented as a software application that is a part of an additional software application. In some embodiments, at least method 300, method 400, method 500, method 700, method 800, method 900A, method 1000A or method 1100A is implemented as a plug-in to a software application.

In some embodiments, at least method 300, method 400, method 500, method 700, method 800, method 900A, method 1000A or method 1100A is implemented as a software application that is a portion of an orchestrator tool, an OBF tool, an inventory tool, a data center construction tool, or a BMaaS. In some embodiments, at least method 300, method 400, method 500, method 700, method 800, method 900A, method 1000A or method 1100A is implemented as a software application that is used by an orchestrator tool an OBF tool, an inventory tool, a data center construction tool, or a BMaaS. In some embodiments, the BMaaS tool is used to automatically discover one or more components in one or more servers of a set of servers.

In some embodiments, one or more of the operations of method 300, 400, 500, 700, 800, 900A, 1000A or 1100A is not performed.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

One aspect of this description relates to a method. In some embodiments, the method includes identifying, by a first server, a first set of servers in an edge data center, the first server being connected to the first set of servers by a first switch; discovering, by the first server, details of a plurality of components of each corresponding server of the first set of servers; updating, by the first server, inventory of the first set of servers based on at least the details of the plurality of components of each corresponding server of the first set of servers, the inventory being stored in a database; and performing health checks on the first set of servers according to a health check frequency. In some embodiments, performing the health checks includes at least one of detecting a removal of a second server from the first set of servers, detecting an addition of the second server to the first set of servers, detecting an addition of a new component in the second server, or detecting a replacement of a failed component in the second server in response to detecting a failure of the failed component.

Another aspect of this description relates to a system. In some embodiments, the system includes a memory having non-transitory instructions stored, and a processor coupled to the memory, and being configured to execute the instructions, thereby causing the apparatus to: identify a first set of servers in an edge data center, the apparatus being connected to the first set of servers by a first switch; discover details of a plurality of components of each corresponding server of the first set of servers; update inventory of the first set of servers based on at least the details of the plurality of components of each corresponding server of the first set of servers, the inventory being stored in a database; and perform health checks on the first set of servers according to a health check frequency. In some embodiments, the apparatus configured to perform the health checks includes the apparatus to at least one of detect a removal of a second server from the first set of servers, detect an addition of the second server to the first set of servers, detect an addition of a new component in the second server, or detect a replacement of a failed component in the second server in response to detection of a failure of the failed component.

Still another aspect of this description relates to a computer-readable medium. In some embodiments, the computer-readable medium includes identifying a first set of servers in an edge data center, the first server being connected to the first set of servers by a first switch; discovering details of a plurality of components of each corresponding server of the first set of servers; updating inventory of the first set of servers based on at least the details of the plurality of components of each corresponding server of the first set of servers, the inventory being stored in a database; and performing health checks on the first set of servers according to a health check frequency. In some embodiments, performing the health checks includes at least one of detecting a removal of a second server from the first set of servers, detecting an addition of the second server to the first set of servers, detecting an addition of a new component in the second server, or detecting a replacement of a failed component in the second server in response to detecting a failure of the failed component.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   identifying, by a first server, a first set of servers in an edge data center, the first server being connected to the first set of servers by a first switch;
   discovering, by the first server, details of a plurality of components of each corresponding server of the first set of servers, wherein discovering the first set of servers connected to the first switch comprises:
      logging into the first switch by the first server;
      obtaining, by the first server, a first set of media access control (MAC) addresses for a first set of devices connected to the first switch, the first set of devices including the first set of servers;
      filtering a first MAC address of each server of the first set of servers from the first set of MAC addresses based on a corresponding organizationally unique identifier (OUI) prefix in the first set of MAC addresses;
      converting, by the first server, each server's first MAC address into a corresponding internet protocol (IP) address based on an extended unique identifier-64 (EUI-64); and
      storing the corresponding IP address of each server of the first set of servers in the first server;
   updating, by the first server, inventory of the first set of servers based on at least the details of the plurality of components of each corresponding server of the first set of servers, the inventory being stored in a database; and
   performing health checks on the first set of servers according to a health check frequency, wherein performing the health checks includes at least one of:
      detecting a removal of a second server from the first set of servers;
      detecting an addition of the second server to the first set of servers;
      detecting an addition of a new component in the second server; or
      detecting a replacement of a failed component in the second server in response to detecting a failure of the failed component.

2. The method of claim 1, wherein identifying the first set of servers in the edge data center comprises:
   receiving, by the first server, point of entry details of the first switch from the database; and
   discovering the first set of servers connected to the first switch.

3. The method of claim 1, wherein discovering the details of the plurality of components of each corresponding server in the first set of servers comprises:
   logging into each server of the first set of servers by the first server based on the corresponding IP addresses of each server of the first set of servers using a first application programming interface (API);
   obtaining, by the first server, the details of the plurality of components of each corresponding server of the first set of servers, wherein the details of the plurality of components includes at least memory, hard drive disk, peripheral component interconnect express (PCIe) devices, redundant array of independent disks (RAID), central processing unit (CPU), power supply units, basic input output system (BIOS), network interface cards (NIC), fans, or field programmable gate array (FPGA); and storing the details of the plurality of components of each corresponding server of the first set of servers in the first server.

4. The method of claim 3, wherein performing the health checks on the first set of servers further comprises:

periodically performing, by the first server, periodic reconciliation of the plurality of components of each corresponding server of the first set of servers in a first time period, wherein performing the periodic reconciliation of the plurality of components of each corresponding server of the first set of servers comprises:

logging into each server of the first set of servers by the first server based on the corresponding IP addresses of each server of the first set of servers using the first API;

obtaining, by the first server, at least updated details of the plurality of components of each corresponding server of the first set of servers; and storing at least the updated details of the plurality of components of each corresponding server of the first set of servers in the first server; and updating the inventory of at least the updated details of the plurality of components of each corresponding server of the first set of servers in the first server.

5. The method of claim 3, wherein performing the health checks on the first set of servers further comprises:

performing, by the first server, alert-based reconciliation of the plurality of components of each corresponding server of the first set of servers in real-time, wherein performing the alert-based reconciliation of the plurality of components of each corresponding server of the first set of servers comprises:

monitoring, by an observability framework (OBF) tool, events of the first set of servers, the events including fault, performance, logging and inventory update events;

publishing, by the OBF tool, the events over a Kafka interface to the first server;

filtering, by the first server, the inventory update events from the events;

identifying, by the first server, which servers of the first set of servers or data centers have been updated based on the inventory update events; and discovering, by the first server, at least updated details of the plurality of components of each corresponding server of the first set of servers or data centers that have been updated based on the inventory update events; and updating the inventory of at least the updated details of the plurality of components of each corresponding server of the first set of servers or data centers that have been updated based on the inventory update events.

6. The method of claim 1, wherein updating the inventory of the first set of servers comprises:

receiving, by the first server, automatic polling requests for updating the inventory; and updating, by a second API, the inventory with the details of the plurality of components of each corresponding server of the first set of servers discovered by the first server in response to the automatic polling request.

7. An apparatus, comprising:

a memory having non-transitory instructions stored therein; and a processor coupled to the memory, and being configured to execute the non-transitory instructions, thereby causing the apparatus to:

identify a first set of servers in an edge data center, the apparatus being connected to the first set of servers by a first switch;

discover details of a plurality of components of each corresponding server of the first set of servers, wherein the non-transitory instructions that cause the apparatus to discover the first set of servers comprises, the processor being further configured to cause the apparatus to:

log into the first switch;

obtain a first set of media access control (MAC) addresses for a first set of devices connected to the first switch, the first set of devices including the first set of servers;

filter a first MAC address of each server of the first set of servers from the first set of MAC addresses based on a corresponding organizationally unique identifier (OUI) prefix in the first set of MAC addresses;

convert each server's first MAC address into a corresponding internet protocol (IP) address based on an extended unique identifier-64 (EUI-64); and store the corresponding IP address of each server of the first set of servers;

update inventory of the first set of servers based on at least the details of the plurality of components of each corresponding server of the first set of servers, the inventory being stored in a database; and perform health checks on the first set of servers according to a health check frequency, wherein the apparatus configured to perform the health checks includes the apparatus to at least one of:

detect a removal of a second server from the first set of servers;

detect an addition of the second server to the first set of servers;

detect an addition of a new component in the second server; or detect a replacement of a failed component in the second server in response to detection of a failure of the failed component.

8. The apparatus of claim 7, wherein the non-transitory instructions that cause the apparatus to identify the first set of servers in the edge data center comprises, the processor being further configured to cause the apparatus to:

receive point of entry details of the first switch from the database; and discover the first set of servers connected to the first switch.

9. The apparatus of claim 7 wherein the non-transitory instructions that cause the apparatus to discover the details of the plurality of components of each corresponding server in the first set of servers comprises, the processor being further configured to cause the apparatus to:

log into each server of the first set of servers based on the corresponding IP addresses of each server of the first set of servers using a first application programming interface (API);

obtain the details of the plurality of components of each corresponding server of the first set of servers, wherein the details of the plurality of components includes at least memory, hard drive disk, peripheral component interconnect express (PCIe) devices, redundant array of independent disks (RAID), central processing unit (CPU), power supply units, basic input output system (BIOS), network interface cards (NIC), fans, or field programmable gate array (FPGA); and
store the details of the plurality of components of each corresponding server of the first set of servers.

10. The apparatus of claim 9, wherein the non-transitory instructions that cause the apparatus to perform the health checks on the first set of servers further comprises, the processor being further configured to cause the apparatus to:
perform periodic reconciliation of the plurality of components of each corresponding server of the first set of servers in a first time period, wherein the instructions that cause the apparatus to perform the periodic reconciliation of the plurality of components of each corresponding server of the first set of servers comprises, the processor being further configured to cause the apparatus to:
log into each server of the first set of servers based on the corresponding IP addresses of each server of the first set of servers using the first API;
obtain at least updated details of the plurality of components of each corresponding server of the first set of servers; and
store at least the updated details of the plurality of components of each corresponding server of the first set of servers; and
update the inventory of at least the updated details of the plurality of components of each corresponding server of the first set of servers.

11. The apparatus of claim 9, wherein the non-transitory instructions that cause the apparatus to perform the health checks on the first set of servers further comprises, the processor being further configured to cause the apparatus to:
perform alert-based reconciliation of the plurality of components of each corresponding server of the first set of servers in real-time, wherein the instructions that cause the apparatus to perform the alert-based reconciliation of the plurality of components of each corresponding server of the first set of servers comprises, the processor being further configured to cause the apparatus to:
receive events of the first set of servers over a Kafka interface from an observability framework (OBF) tool, the events including fault, performance, logging and inventory update events;
filter the inventory update events from the events;
identify which servers of the first set of servers or data centers have been updated based on the inventory update events; and
discover at least updated details of the plurality of components of each corresponding server of the first set of servers or data centers that have been updated based on the inventory update events; and
update the inventory of at least the updated details of the plurality of components of each corresponding server of the first set of servers or data centers that have been updated based on the inventory update events.

12. The apparatus of claim 7, wherein the non-transitory instructions that cause the apparatus to update the inventory of the first set of servers comprises, the processor being further configured to cause the apparatus to:
receive automatic polling requests for updating the inventory; and
update the inventory with the details of the plurality of components of each corresponding server of the first set of servers in response to the automatic polling request.

13. A non-transitory computer-readable medium including instructions executable by a controller of a first server to cause the controller to perform operations comprising:
identifying a first set of servers in an edge data center, the first server being connected to the first set of servers by a first switch;
discovering details of a plurality of components of each corresponding server of the first set of servers, wherein discovering the first set of servers connected to the first switch comprises:
logging into the first switch;
obtaining a first set of media access control (MAC) addresses for a first set of devices connected to the first switch, the first set of devices including the first set of servers;
filtering a first MAC address of each server of the first set of servers from the first set of MAC addresses based on a corresponding organizationally unique identifier (OUI) prefix in the first set of MAC addresses;
converting each server's first MAC address into a corresponding internet protocol (IP) address based on an extended unique identifier-64 (EUI-64); and
storing the corresponding IP address of each server of the first set of servers in the first server;
updating inventory of the first set of servers based on at least the details of the plurality of components of each corresponding server of the first set of servers, the inventory being stored in a database; and
performing health checks on the first set of servers according to a health check frequency, wherein performing the health checks includes at least one of:
detecting a removal of a second server from the first set of servers;
detecting an addition of the second server to the first set of servers;
detecting an addition of a new component in the second server; or
detecting a replacement of a failed component in the second server in response to detecting a failure of the failed component.

14. The non-transitory computer-readable medium of claim 13, wherein
identifying the first set of servers in the edge data center comprises:
receiving, by the first server, point of entry details of the first switch from the database; and
discovering the first set of servers connected to the first switch;
updating the inventory of the first set of servers comprises:
receiving, by the first server, automatic polling requests for updating the inventory; and
updating, by a second API, the inventory with the details of the plurality of components of each corresponding server of the first set of servers discovered by the first server in response to the automatic polling request.

15. The non-transitory computer-readable medium of claim 13, wherein discovering the details of the plurality of components of each corresponding server of the first set of servers comprises:
logging into each server of the first set of servers by the first server based on the corresponding IP addresses of each server of the first set of servers using a first application programming interface (API);

obtaining the details of the plurality of components of each corresponding server of the first set of servers, wherein the details of the plurality of components includes at least memory, hard drive disk, peripheral component interconnect express (PCIe) devices, redundant array of independent disks (RAID), central processing unit (CPU), power supply units, basic input output system (BIOS), network interface cards (NIC), fans, or field programmable gate array (FPGA); and storing the details of the plurality of components of each corresponding server of the first set of servers in the first server.

16. The non-transitory computer-readable medium of claim 15, wherein performing the health checks on the first set of servers further comprises:

periodically performing periodic reconciliation of the plurality of components of each corresponding server of the first set of servers in a first time period, wherein performing the periodic reconciliation of the plurality of components of each corresponding server of the first set of servers comprises:

logging into each server of the first set of servers by the first server based on the corresponding IP addresses of each server of the first set of servers using the first API;

obtaining at least updated details of the plurality of components of each corresponding server of the first set of servers; and storing at least the updated details of the plurality of components of each corresponding server of the first set of servers in the first server; and updating the inventory of at least the updated details of the plurality of components of each corresponding server of the first set of servers in the first server.

17. The non-transitory computer-readable medium of claim 15, wherein performing the health checks on the first set of servers further comprises:

performing alert-based reconciliation of the plurality of components of each corresponding server of the first set of servers in real-time, wherein performing the alert-based reconciliation of the plurality of components of each corresponding server of the first set of servers comprises:

receiving events of the first set of servers from an observability framework (OBF) tool over a Kafka interface, the events including fault, performance, logging and inventory update events;

filtering the inventory update events from the events;

identifying which servers of the first set of servers or data centers have been updated based on the inventory update events; and discovering at least updated details of the plurality of components of each corresponding server of the first set of servers or data centers that have been updated based on the inventory update events; and updating the inventory of at least the updated details of the plurality of components of each corresponding server of the first set of servers or data centers that have been updated based on the inventory update events.

* * * * *